United States Patent
Matsui

(10) Patent No.: US 10,878,419 B2
(45) Date of Patent: Dec. 29, 2020

(54) PAYMENT SYSTEM, PAYMENT APPARATUS, PROGRAM, AND PAYMENT METHOD

(71) Applicant: NEC CORPORATION, Tokyo (JP)

(72) Inventor: Takahiro Matsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 15/562,220

(22) PCT Filed: Mar. 25, 2016

(86) PCT No.: PCT/JP2016/059621
§ 371 (c)(1),
(2) Date: Sep. 27, 2017

(87) PCT Pub. No.: WO2016/158748
PCT Pub. Date: Oct. 6, 2016

(65) Prior Publication Data
US 2018/0096353 A1    Apr. 5, 2018

(30) Foreign Application Priority Data
Mar. 31, 2015  (JP) ................. 2015-072035

(51) Int. Cl.
*G06Q 20/00* (2012.01)
*G06Q 20/40* (2012.01)
(Continued)

(52) U.S. Cl.
CPC ..... *G06Q 20/4014* (2013.01); *G06K 9/00228* (2013.01); *G06K 9/00677* (2013.01);
(Continued)

(58) Field of Classification Search
CPC ................. G06Q 20/4014; G06K 9/00228
(Continued)

(56) References Cited

U.S. PATENT DOCUMENTS

2006/0265602 A1* 11/2006 Robinson ........... G06Q 20/3678
  713/186
2008/0040278 A1*  2/2008 DeWitt ............. G06Q 30/0268
  705/44
(Continued)

FOREIGN PATENT DOCUMENTS

| JP | 2012-248162 A | 12/2012 |
| JP | 2013-186495 A | 9/2013 |
| JP | 2015-038721 A | 2/2015 |

OTHER PUBLICATIONS

International Search Report for PCT/JP2016/059621 dated Jun. 21, 2016 [PCT/ISA/210].
(Continued)

Primary Examiner — Rokib Masud
(74) Attorney, Agent, or Firm — Sughrue Mion, PLLC

(57) ABSTRACT

A first image capture unit generates a first customer image. A generation unit generates association information in which the first image and payment information are associated with each other. A second image capture unit generates a second customer image. A calculation unit calculates a first degree of similarity between a customer included in the first image and a customer included in the second image. An acquisition unit acquires payment information associated with the first image where there is the first image having the first degree of similarity equal to or greater than a first threshold value. A display control unit displays a candidate image where there is no first image having the first degree of similarity equal to or greater than the first threshold value. A first input reception unit receives an input for selecting a candidate image. The acquisition unit acquires payment information associated with the selected candidate image.

16 Claims, 14 Drawing Sheets

(51) Int. Cl.
| | |
|---|---|
| *G06K 9/62* | (2006.01) |
| *G06K 9/00* | (2006.01) |
| *G06K 9/46* | (2006.01) |
| *G07G 1/14* | (2006.01) |
| *G06Q 20/18* | (2012.01) |
| *G07G 1/00* | (2006.01) |
| *G07G 1/12* | (2006.01) |
| *G06Q 20/20* | (2012.01) |

(52) U.S. Cl.
CPC ............. *G06K 9/46* (2013.01); *G06K 9/6215* (2013.01); *G06Q 20/18* (2013.01); *G06Q 20/206* (2013.01); *G06Q 20/40145* (2013.01); *G07G 1/0036* (2013.01); *G07G 1/12* (2013.01); *G07G 1/14* (2013.01)

(58) Field of Classification Search
USPC ..................................................... 705/18, 26
See application file for complete search history.

(56) References Cited

U.S. PATENT DOCUMENTS

2009/0112754 A1* 4/2009 Seifert .................. G06Q 20/40
 705/39
2015/0026018 A1 1/2015 Nimiya et al.

OTHER PUBLICATIONS

Written Opinion for PCT/JP2016/059621 dated Jun. 21, 2016 [PCT/ISA/237].

* cited by examiner

| PAYMENT INFORMATION ID | PRODUCT LIST | | |
|---|---|---|---|
| | PRODUCT ID | PRODUCT ID | ... |
| P001 | I001 | I003 | ... |

202 — PAYMENT INFORMATION ID
206 — PRODUCT ID (first)
204 — PRODUCT LIST

PAYMENT SYSTEM, PAYMENT APPARATUS, PROGRAM, AND PAYMENT METHOD

CROSS REFERENCE TO RELATED APPLICATIONS

This application is a National Stage of International Application No. PCT/JP2016/059621 filed Mar. 25, 2016, claiming priority based on Japanese Patent Application No. 2015-072035 filed Mar. 31, 2015, the contents of all of which are incorporated herein by reference in their entirety.

TECHNICAL FIELD

The present invention relates to a payment system, a payment apparatus, a program, and a payment method.

BACKGROUND ART

In a register terminal in a store such as a supermarket, two processes of (1) a process of registration for a product to be paid (reading of a bar code, and the like) and (2) a process of payment for the registered product (reception of money, return of change, and the like) are performed.

In addition, there is an operation method in which functions of the register terminal are divided into two apparatuses, and the process (1) and the process (2) are performed by different apparatuses. For example, Patent Document 1 discloses a self-POS system in which a registration apparatus used in the process (1) and a payment apparatus used in the process (2) are separately provided. A sales clerk registers a product by using the registration apparatus. The registration apparatus captures an image of a customer by an image capture unit. The sales clerk operating the registration apparatus selects an image of the customer which is associated with payment data (data regarding the registered product) from images of the customer which are captured by the image capture unit. As a result, the registration apparatus associates the image of the customer and the payment data with each other. Thereafter, the customer performs payment by using the payment apparatus. The payment apparatus captures an image of the customer and acquires payment data associated with an image of the customer having high consistency with the generated image of the customer. The customer performs payment based on the payment data by using the payment apparatus.

RELATED DOCUMENT

Patent Document

[Patent Document 1] Japanese Patent Application Publication No. 2012-248162

SUMMARY OF THE INVENTION

Technical Problem

It may happen that consistency between the customer included in the image generated by the registration apparatus and the same customer included in the image generated by the payment apparatus is low. For example, in a case where the customer takes off a mask, a hat, or the like before using the payment apparatus that he/she wears when using the registration apparatus, consistency between the customer included in the image generated by the registration apparatus and the customer included in the image generated by the accounting apparatus becomes low.

Patent Document 1 does not mention such a case where consistency between the customer included in the image generated by the registration apparatus and the same customer included in the image generated by the payment apparatus is low.

The invention is contrived in view of such situations, and an object of the invention is to provide a technique for enabling a customer to reliably perform payment for a product.

Solution to Problem

A payment system of the present invention includes a product registration apparatus and a payment apparatus.

The product registration apparatus includes: a first image capture unit generating a first customer image including a customer; and a generation unit generating association information that associates payment information used for payment of a product with the first customer image.

The payment apparatus includes: a second image capture unit generating a second customer image including a customer, and a first display control unit displaying a candidate image on a display apparatus viewable by the customer, the candidate image being a candidate of the first customer image that includes the same customer as the customer included in the second customer image.

The payment apparatus of the invention is a payment apparatus included in the payment system of the invention.

A program of the invention is a program causing a computer to operate as the payment apparatus of the invention.

A payment method of the invention is a payment method performed in a payment system including a product registration apparatus and a payment apparatus. The payment method includes: a first image capture step of causing the product registration apparatus to generate a first customer image including a customer; a generation step of causing the product registration apparatus to generate association information that associates payment information used for payment of a product with the first customer image; a second image capture step of causing the payment apparatus to generate a second customer image including a customer; and a first display control step of causing the payment apparatus to display a candidate image on a display apparatus viewable by the customer, the candidate image being a candidate of the first customer image that includes the same customer as the customer included in the second customer image.

Advantageous Effects of Invention

According to the invention, a technique for enabling a customer to reliably perform payment of a product is provided.

BRIEF DESCRIPTION OF THE DRAWINGS

The above-described objects, other objects, features and advantages will be further apparent from the preferred example embodiments described below, and the accompanying drawings as follows.

FIG. 7 is a diagram illustrating payment information in a table format.

FIG. 9 is a diagram illustrating display in a display apparatus.

DESCRIPTION OF EMBODIMENTS

Figure 1:
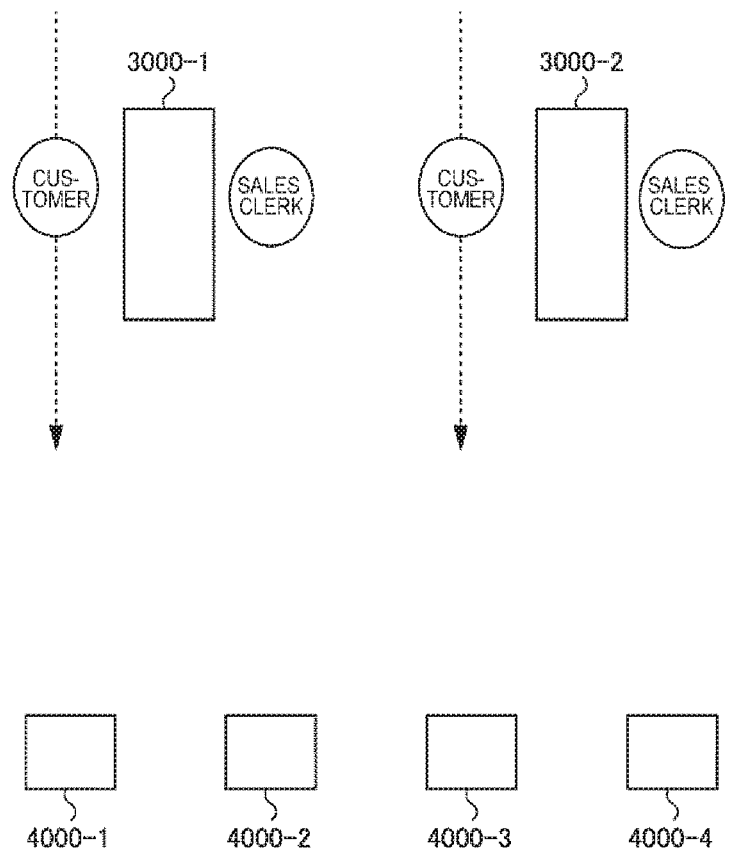
FIG. 1 is a diagram illustrating an arrangement of product registration apparatuses and payment apparatuses which are included in a payment system.

Hereinafter, example embodiments of the invention will be described with reference to the accompanying drawings. In all of the drawings, like reference numerals denote like components, and a description thereof will not be repeated.

First Example Embodiment

FIG. 1 is a diagram illustrating an arrangement of product registration apparatuses 3000 and payment apparatuses 4000 which are included in a payment system 2000. The payment system 2000 includes the product registration apparatus 3000 and the payment apparatus 4000. As illustrated in FIG. 1, the product registration apparatus 3000 and the payment apparatus 4000 are provided as separated apparatuses. In a store using the payment system 2000, the payment of products is performed using the product registration apparatus 3000 and the payment apparatus 4000. Here, the number of product registration apparatuses 3000 and the number payment apparatuses 4000 which are installed are one or more.

The product registration apparatus 3000 is used for a process of registering a product as a target of payment. A customer who desires to purchase a product brings the product to the product registration apparatus 3000. A sales clerk operating the product registration apparatus 3000 receives the product from the customer and registers the product as a target of payment. Here, any of various known techniques can be used as a method of registering the product as a target of payment. For example, the sales clerk causes a reader included in the product registration apparatus 3000 to read a bar code or the like which is attached to each product. The product registration apparatus 3000 generates payment information in accordance with the registration of the product. The payment information is information regarding a payment process for the product registered as a target of payment.

The payment apparatus 4000 is used for the payment (reception of money, and the like) of a product registered as a target of payment. After the registration of the product is terminated, the customer moves to any payment apparatus 4000. The payment apparatus 4000 acquires payment information regarding the product purchased by the customer, and performs a payment process on the basis of the payment information. Specifically, the payment apparatus 4000 performs: providing expense to the customer; counting-up of money inserted by the customer; giving change to the customer; issuing a receipt; and the like.

<Configurations of Product Registration Apparatus 3000 and Payment Apparatus 4000>

Figure 2:
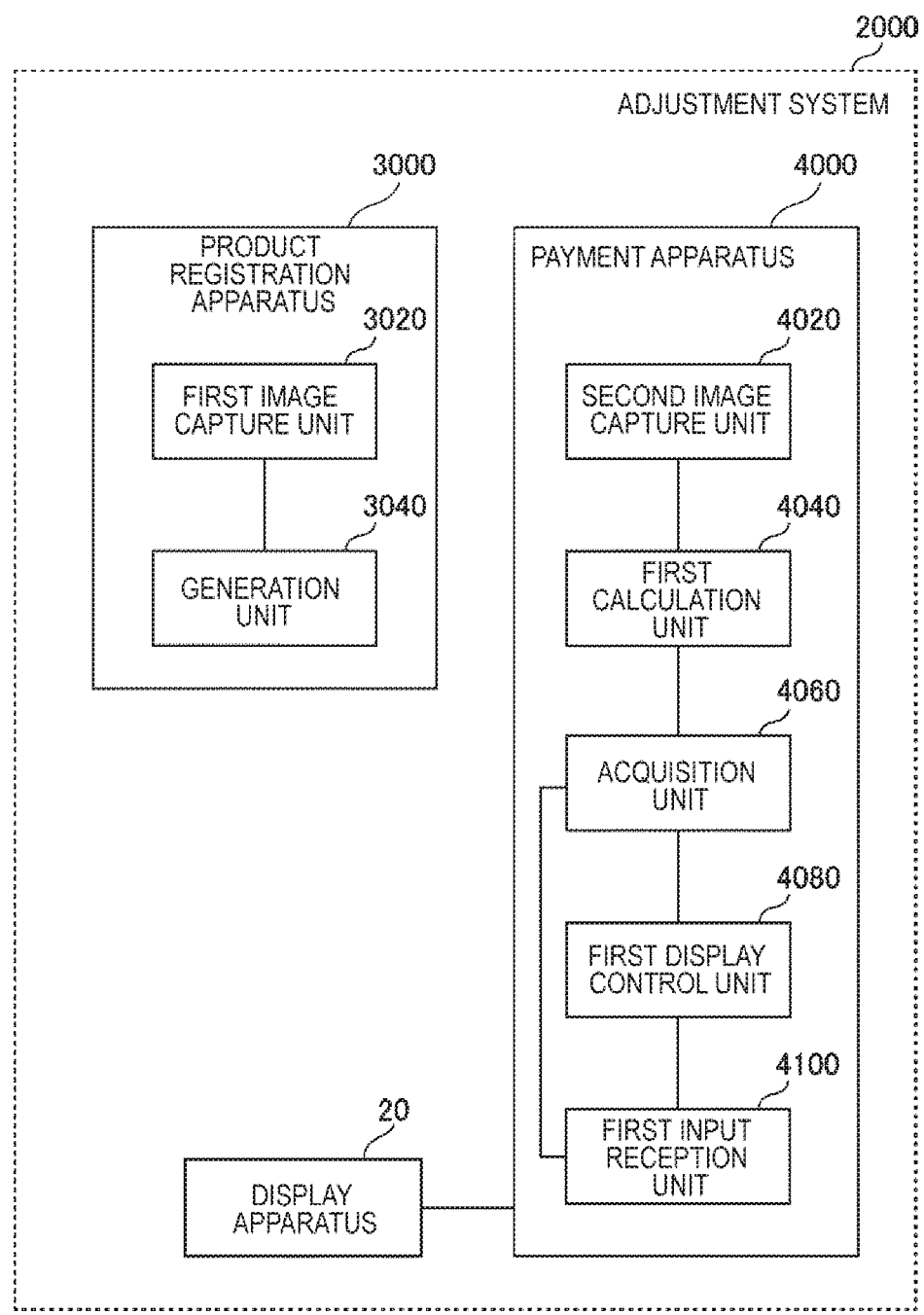
FIG. 2 is a block diagram illustrating a payment system according to a first example embodiment.

FIG. 2 is a block diagram illustrating the payment system 2000 according to a first example embodiment. In FIG. 2, each block represents a function-based configuration instead of a hardware-based configuration.

The product registration apparatus 3000 includes a first image capture unit 3020 and a generation unit 3040. The first image capture unit 3020 generates an image including a customer. Hereinafter, an image generated by the first image capture unit 3020 will be referred to as a first customer image. The generation unit 3040 generates association information. The association information is information in which the first customer image and the payment information are associated with each other.

The payment apparatus 4000 includes a second image capture unit 4020, a first calculation unit 4040, an acquisition unit 4060, a first display control unit 4080, and a first input reception unit 4100. The second image capture unit 4020 generates an image including a customer. Hereinafter, an image generated by the second image capture unit 4020 will be referred to as a second customer image.

The first calculation unit 4040 calculates the degree of similarity between a customer included in respective images (first customer image) captured by the first image capture unit 3020 and the customer included in an image (second customer image) captured by the second image capture unit 4020. Hereinafter, this degree of similarity will be referred to as a first degree of similarity.

The acquisition unit 4060 determines whether or not there is the first customer image satisfying a matching condition. The matching condition is a condition in which "the first degree of similarity between the customer included in the first customer image and the customer included in the second customer image is equal to or greater than a first threshold value". In a case where there is the first customer image satisfying the matching condition, the acquisition unit 4060 acquires the payment information associated with the first customer image. As described above, the payment information and the first customer image are associated with each other by association information.

In a case where there is no first customer image satisfying the matching condition, the first display control unit 4080 displays a candidate image on a display apparatus 20. The candidate image is a candidate of the first customer image including the same customer as the customer included in the second customer image. Here, the display apparatus 20 set to be a display destination of the candidate image by the first display control unit 4080 is a display apparatus that can be viewed by the customer using the payment apparatus 4000.

The first input reception unit 4100 receives an input for selecting a candidate image. In a case where the first input reception unit 4100 receives the selection of the candidate image, the acquisition unit 4060 acquires payment information associated with the candidate image (first customer image) which is selected in the association information.

<Advantageous Effect>

The degree of similarity between the customer included in the first customer image and the same customer included in the second customer image could be low. Such a situation occurs, for example, in a case where there is a difference in the customer's belongings between when the product registration apparatus 3000 is used and when the payment apparatus 4000 is used. Specifically, it is possible to consider a case where the customer having worn a mask when using the product registration apparatus 3000 takes off the mask before using the payment apparatus 4000.

Consequently, in a case where there is no first customer image including a customer having a high degree of similarity (the first degree of similarity is equal to or greater than the first threshold value) to a customer using the payment apparatus 4000, the payment apparatus 4000 according to this example embodiment displays a candidate of the first customer image including the same customer as the customer using the payment apparatus 4000 and causes the customer to select the candidate. Accordingly, even when the degree of similarity between the customer included in the first customer image and the same customer included in the second customer image becomes low, the payment apparatus 4000 can perform a payment process by acquiring payment information associated with the first customer image selected by the customer. Therefore, according to the payment system 2000 of this example embodiment, the customer can reliably perform the payment of a product.

Hereinafter, this example embodiment will be described in more detail.

<Flow of Processing>

Figure 3:
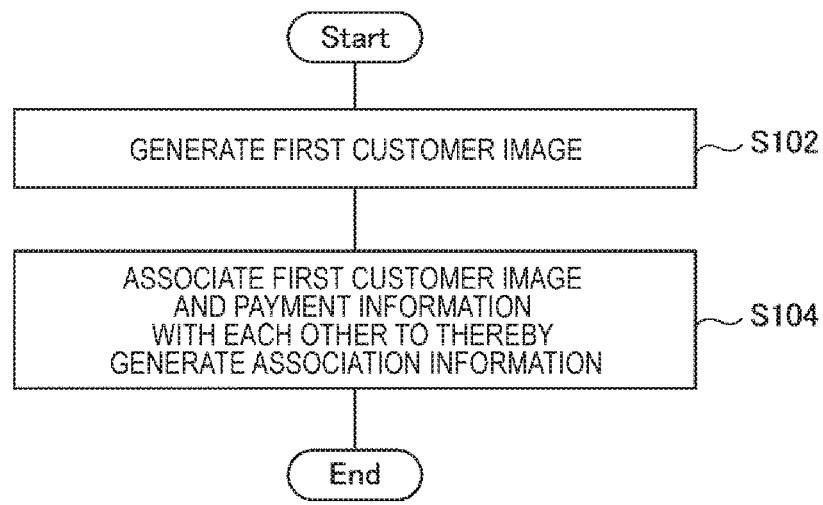
FIG. 3 is a flow chart illustrating processing performed by a product registration apparatus according to the first example embodiment.

FIG. 3 is a flow chart illustrating processing performed by the product registration apparatus 3000 according to the first example embodiment. The first image capture unit 3020 generates the first customer image (S102). The generation unit 3040 associates the first customer image and payment information with each other to thereby generate association information (S104).

Figure 4:
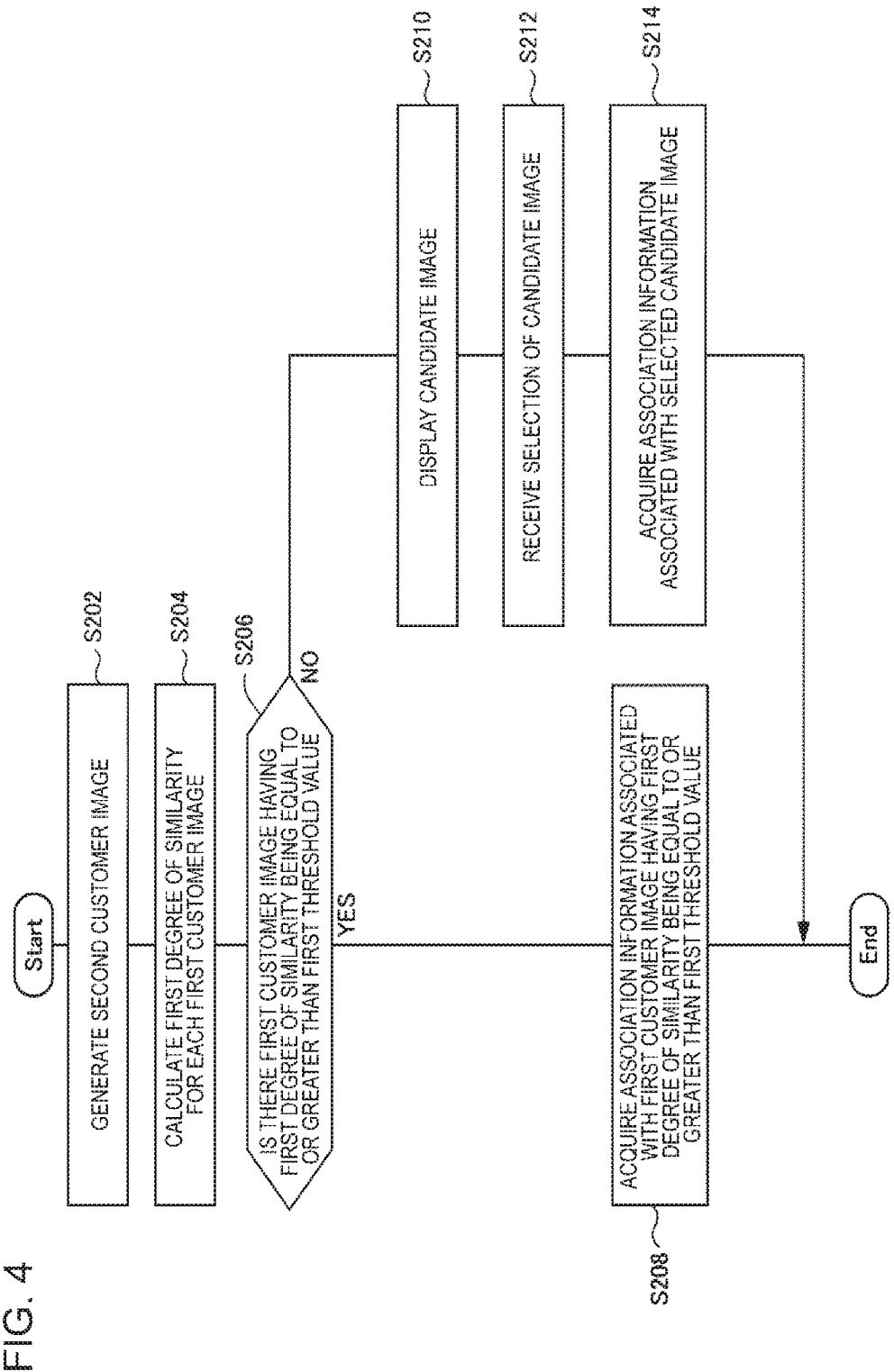
FIG. 4 is a flow chart illustrating a flow of processing performed by a payment apparatus according to the first example embodiment.

FIG. 4 is a flow chart illustrating a flow of processing performed by the payment apparatus 4000 according to the first example embodiment. The second image capture unit 4020 generates the second customer image (S202). The first calculation unit 4040 calculates the first degree of similarity between the customer included in each first customer image and the customer included in the second customer image (S204). The acquisition unit 4060 determines whether or not there is the first customer image having the first degree of similarity equal to or greater than the first threshold value (S206). In a case where there is the first customer image having the first degree of similarity equal to or greater than the first threshold value (S206: YES), the processing of FIG. 4 proceeds to S208. On the other hand, there is no first customer image having the first degree of similarity equal to or greater than the first threshold value (S206: NO), the processing of FIG. 4 proceeds to S210.

In S208, the acquisition unit 4060 acquires payment information associated with the first customer image having the first degree of similarity equal to or greater than the first threshold value.

In S210, in a case where there is no first customer image having the first degree of similarity equal to or greater than the first threshold value, the first display control unit 4080 displays a candidate image on the display apparatus. The first input reception unit 4100 receives the selection of the candidate image (S212). The acquisition unit 4060 acquires payment information associated with the selected candidate image (S214).

<Example of Hardware Realizing Product Registration Apparatus 3000>

Each functional configuration unit of the product registration apparatus 3000 or the payment apparatus 4000 may be realized by hardware (for example, a hard-wired electronic circuit or the like) which realizes each functional configuration unit, or may be realized by a combination of hardware and software (for example, a combination of an electronic circuit and a program for controlling the electronic circuit, or the like).

Figure 5:
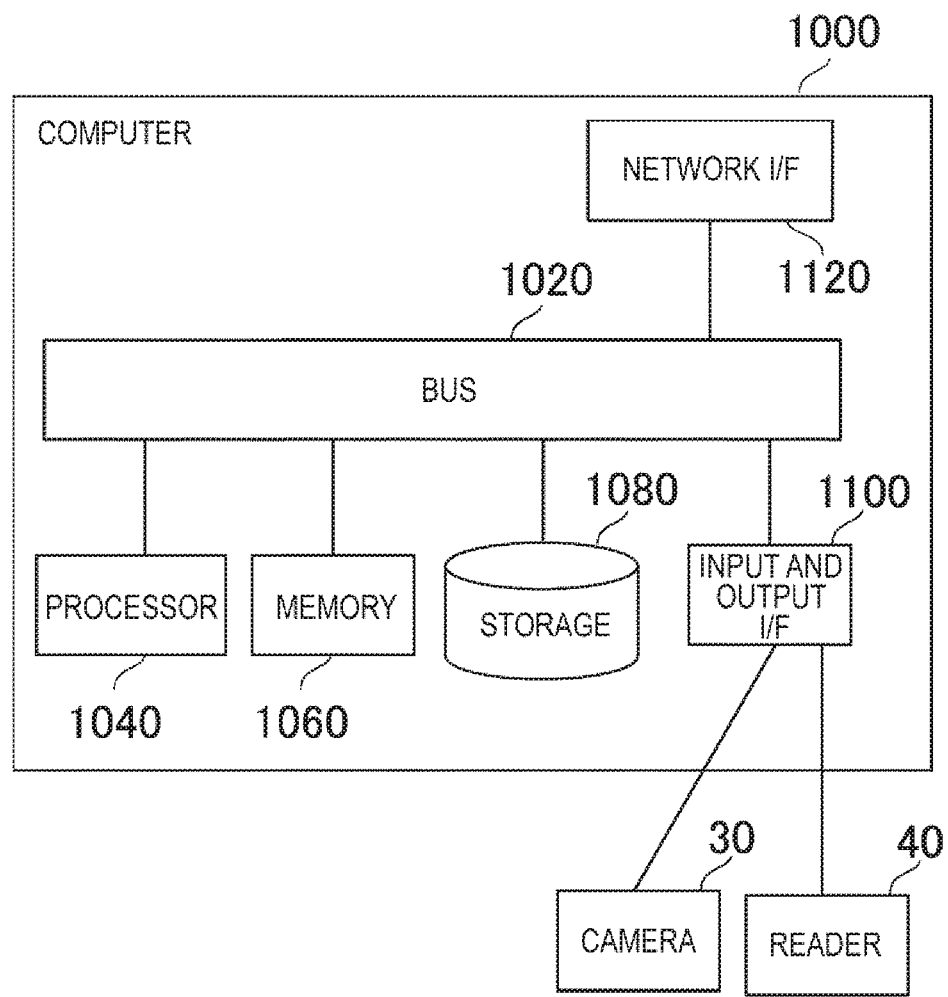
FIG. 5 is a diagram illustrating a hardware configuration of a computer that realizes the product registration apparatus according to the first example embodiment.

FIG. 5 is a diagram illustrating a hardware configuration of a computer 1000 realizing the product registration apparatus 3000 according to the first example embodiment. The computer 1000 may be implemented using a special-purpose apparatus such as a register terminal, or may be implemented using a general-purpose apparatus such as a personal computer (PC) or a portable terminal.

The computer 1000 includes a bus 1020, a processor 1040, a memory 1060, a storage 1080, an input and output interface 1100, and a network interface 1120. The bus 1020 is a data transmission path through which the processor 1040, the memory 1060, the storage 1080, the input and output interface 1100, and the network interface 1120 transmit and receive data to and from each other. However, a method of connecting the processor 1040 and the like to each other is not limited to connection through a bus. The processor 1040 is a processor such as a central processing unit (CPU) or a graphics processing unit (GPU). The memory 1060 is a memory such as a random access memory (RAM) or a read only memory (ROM). The storage 1080 is a storage apparatus such as a hard disk, a solid state drive (SSD), or a memory card. In addition, the storage 1080 may be a memory such as a RAM or a ROM.

The input and output interface 1100 is an interface for connecting the computer 1000 and an input and output device to each other. The input and output device is, for example, a keyboard, a mouse, or the like.

The network interface 1120 is an interface for communicably connecting the computer 1000 to an external apparatus. The network interface 1120 may be a network interface for connection to a wired line, or may be a network interface for connection to a wireless line. For example, the computer 1000 realizing the product registration apparatus 3000 is connected to a computer 6000 realizing the payment apparatus 4000 through a network.

The storage 1080 stores program modules that respectively realize the function of the first image capture unit 3020 and the function of the generation unit 3040. The processor 1040 executes these program modules to thereby realize functions of the corresponding functional configuration units. Here, when the processor 1040 executes the modules, the processor 1040 may execute the modules after reading out the modules on the memory 1060 or may execute the modules without reading out the modules on the memory 1060.

The hardware configuration of the computer 1000 is not limited to the configuration illustrated in FIG. 5. For example, the program modules may be stored in the memory 1060. In this case, the computer 1000 may not include the storage 1080.

The input and output device connected to the input and output interface 1100 includes a reader 40 that recognizes a product to be registered. A specific method of implementing the reader 40 varies depending on a method of recognizing a product. For example, the reader 40 reads a product information symbol attached to a product. The product information symbol is a symbol attached to the product and is a symbol indicating information for determining the product (an identifier (ID) of product information, and the like). The symbol is a bar code, a two-dimensional code (QR code (registered trademark) or the like), a character string symbol, or the like. Note that the term "character string" as mentioned herein also includes a numerical string. The product information symbol is a bar code obtained by encoding information for determining the product information, a character string symbol indicating information for determining the product information, or the like.

For example, in a case where the product information symbol is a bar code, the reader 40 is a bar code reader. In addition, for example, in a case where the product information symbol is a two-dimensional code, the reader 40 is a two-dimensional code reader. In addition, for example, in a case where the product information symbol is a character string symbol, the reader 40 includes an image capture element that captures the character string, and a processing unit that analyzes the captured character string symbol to thereby determine an ID of the product, and the like. Note that any of various known techniques related to the analysis of a character string can be used for the analysis of the character string symbol. These known techniques will not be described.

Note that, in a case where a plurality types of symbols are used as the product information symbol, a plurality types of readers are connected to the input and output interface 1100. For example, in a case where a bar code and a two-dimensional code are used as the product information symbol, a bar code reader and a two-dimensional code reader are connected to the input and output interface 1100.

In addition, the reader 40 may capture a product to generate an image, and may perform object recognition on the product included in the image, to thereby recognize the product.

<<Hardware Configuration of First Image Capture Unit 3020>>

The first image capture unit 3020 includes an image capture element that records a result of image capture. For example, the first image capture unit 3020 is constituted using a camera including the image capture element. The first image capture unit 3020 may capture a still image, or may capture a video. In the latter case, the first customer image is each frame constituting a video.

The first image capture unit 3020 is installed at a position where the first image capture unit can capture a customer using the product registration apparatus 3000. The first image capture unit 3020 and the product registration apparatus 3000 may be provided integrally or separately. In the latter case, for example, as illustrated in FIG. 5, a camera 30 realizing the first image capture unit 3020 is connected to the input and output interface 1100.

<Example of Hardware Realizing Payment Apparatus 4000>

Figure 6:
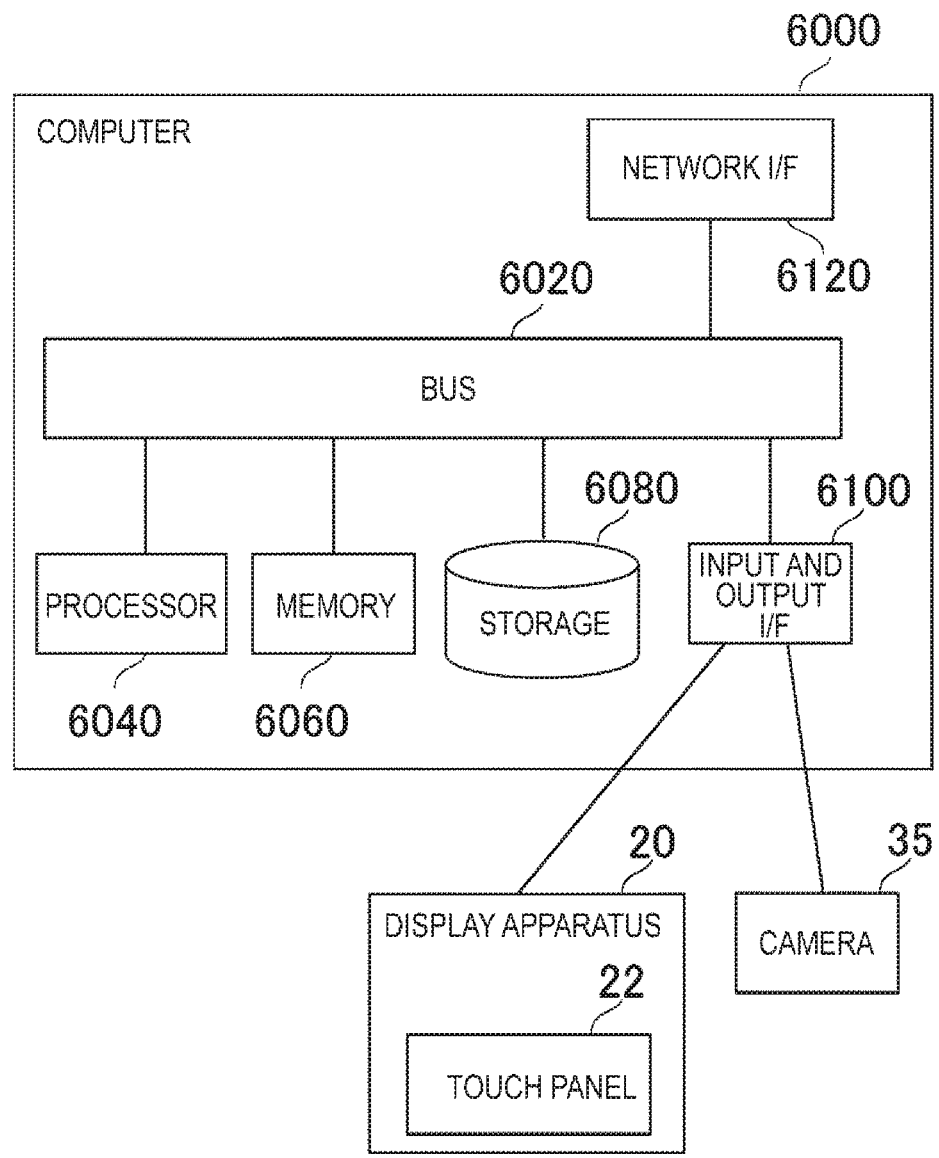
FIG. 6 is a diagram illustrating a hardware configuration of a computer that realizes the payment apparatus according to the first example embodiment.

FIG. 6 is a diagram illustrating a hardware configuration of the computer 6000 realizing the payment apparatus 4000 according to the first example embodiment. The computer 6000 may be implemented using a special-purpose apparatus such as a register terminal, or may be implemented using a general-purpose apparatus such as a personal computer (PC) or a portable terminal. Note that the configuration of the computer 6000 is the same as the configuration of the computer 1000.

A storage 6080 stores program modules for realizing the respective functions of the second image capture unit 4020, the first calculation unit 4040, and the acquisition unit 4060. A processor 6040 executes these program modules to thereby realize functions of the corresponding functional configuration units. Here, when the processor 6040 executes the modules, the processor may execute the modules after reading out the modules on a memory 6060 or may execute the modules without reading out the modules on the memory 6060.

The hardware configuration of the computer 6000 is not limited to the configuration illustrated in FIG. 6. For example, the program modules may be stored in the memory 6060. In this case, the computer 6000 may not include the storage 6080.

An input and output device connected to an input and output interface 6100 includes the display apparatus 20 which is controlled by the first display control unit 4080. The display apparatus 20 is installed so as to face a customer so that it can be viewed by a customer using the payment apparatus 4000. This display apparatus and the payment apparatus 4000 may be provided integrally or separately.

In addition, the input and output device connected to the input and output interface 6100 includes an input device for realizing the function of the first input reception unit 4100. For example, the input device is a touch panel 22 embedded in the display apparatus 20. In addition, for example, the input device may be a keyboard, a mouse, or the like.

Further, the input and output device connected to the input and output interface 6100 includes a device for causing a customer to insert money, a device for giving back change, a device for issuing a receipt, and the like (not shown).

<Process of Registering Product by Product Registration Apparatus 3000>

As described above, the product registration apparatus 3000 generates payment information regarding a product registered as a target of payment. The product registration apparatus 3000 stores the generated payment information in a storage unit provided inside or outside the product registration apparatus 3000.

The target of payment in a single payment process may include a plurality of products. For example, the product registration apparatus 3000 receives an operation of instructing the start of a process of registering the target of payment, and then registers, as the target of payment in a single payment process, a single or a plurality of products registered until receiving an operation of instructing the termination of the process of registering the target of payment. Payment information regarding a certain payment process indicates an ID of each product registered as a target for the payment process, and the like. In addition, the payment information may further indicate a transaction number, an amount of each product, a total amount, and the like.

FIG. 7 is a diagram illustrating payment information in a table format. The payment information illustrated in FIG. 7 is referred to as payment information 200. The payment information 200 includes two rows of a payment information ID 202 and a product list 204. The product list 204 is a list of product IDs registered as the target of payment. A product ID 206 is an ID of a product registered as the target of payment.

Note that any of various known techniques can be used as a specific method of generating payment information for a product recognized by a reader or the like, and thus this method will not be described.

<Details of Processing Performed by First Image Capture Unit 3020>

The first image capture unit 3020 generates the first customer image (S102). The first image capture unit 3020 captures an image at various timings. For example, the first image capture unit 3020 repeatedly captures images at all times during the operation of the product registration apparatus 3000. The first image capture unit 3020 repeatedly captures images, for example, every ⅟₃₀ seconds which is the same as a frame rate of a general video.

In addition, for example, the first image capture unit 3020 may detect that a customer is in the vicinity of the product registration apparatus 3000 and may perform image capture in accordance with the detection. For example, an infrared sensor for detecting a person, and the like are provided in the vicinity of the first image capture unit 3020. The first image capture unit 3020 is notified by the infrared sensor, and thus can recognize that a customer is in the vicinity of the first image capture unit 3020. Consequently, for example, the first image capture unit 3020 captures a customer when the presence of the customer in the vicinity of the first image capture unit 3020 is detected by the infrared sensor, to thereby generate the first customer image.

Note that the first image capture unit 3020 may repeatedly capture images of the customer for a predetermined period of time since the detection has been performed. For example, the first image capture unit 3020 repeatedly captures images of the customer for a predetermined time since the detection has been performed. In addition, for example, the first image capture unit 3020 may repeatedly capture images of the customer until the registration of a product to be purchased by the customer is terminated (payment information is generated) since the detection has been performed.

The above-mentioned "predetermined time" may be previously set in the first image capture unit 3020, or may be stored in a storage unit provided inside or outside the product registration apparatus 3000. In the latter case, the first image capture unit 3020 acquires the predetermined time from the storage unit and uses the predetermined time. Note that, as long as there is no particular description, predetermined values (a predetermined threshold value, a predetermined time, and the like) used by the functional configuration unit described before or later are also set in the functional configuration unit or acquired from a storage unit to use it.

In addition, the first image capture unit 3020 may be operated by a sales clerk operating the product registration apparatus 3000. For example, the sales clerk guides the customer so that the customer's face is included within an image capture range of the first image capture unit 3020 by a method such as talking to the customer. The sales clerk confirms that the customer's face is included within the image capture range of the first image capture unit 3020 and causes the first image capture unit 3020 to capture the customer.

In addition, the guidance may be performed by the first image capture unit 3020. For example, the product registration apparatus 3000 is provided with a display apparatus that displays an image included in the image capture element of the first image capture unit 3020. The display apparatus is installed facing the customer so as to be viewable by the customer. The first image capture unit 3020 guides the customer by displaying a guide on the display apparatus with characters or performing guidance with a sound so as to capture the customer's face by the first image capture unit 3020.

In a case where the first image capture unit 3020 captures the customer multiple times, a plurality of images including the customer are generated. Consequently, the first image capture unit 3020 handles one or more of the plurality of images as first customer images. There are various methods of determining which one is to be handled as the first customer image. For example, the first image capture unit 3020 handles the customer's image seen well as the first customer image. The "customer's image seen well" is an image in which the customer is included in a large size or an image with little blur. Here, a well-known technique can be used as a method of calculating the size of an object (customer) included in the image and a method of calculating the size of blur. Thus, these methods will not be described.

Note that the first image capture unit 3020 may set one customer's image seen best to be the first customer image, or may set a plurality of images in which the customer is seen with a predetermined standard or higher to be the first customer images.

In addition, the first image capture unit 3020 may handle all of the generated images as the first customer images.

<Details of Processing Performed by Generation Unit 3040>

Figure 8:
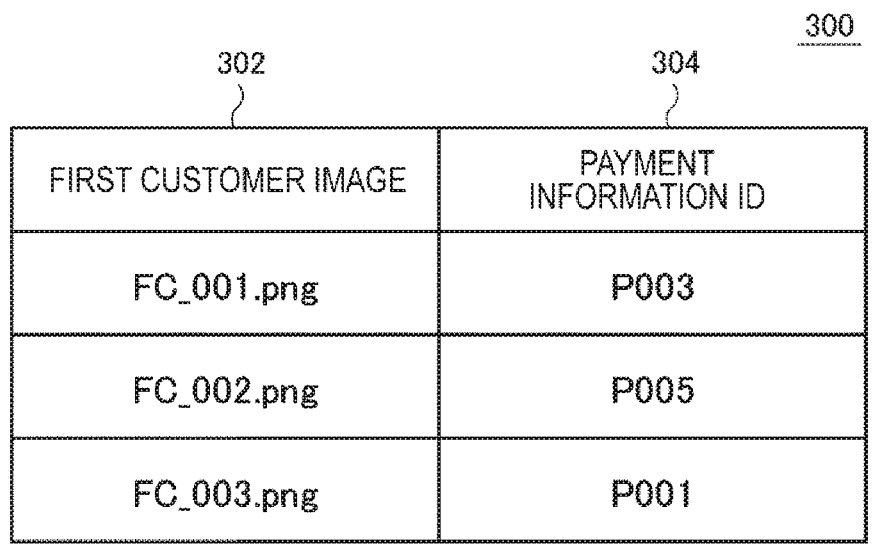
FIG. 8 is a diagram illustrating a configuration of association information in a table format.

The generation unit 3040 generates association information (S104). FIG. 8 is a diagram illustrating a configuration of association information in a table format. The association information illustrated in FIG. 8 is referred to as association information 300. The association information 300 includes two rows of a first customer image 302 and a payment information ID 304. The first customer image 302 indicates an image file in which the first customer image is recorded. The payment information ID 304 indicates an ID of payment information. Note that, in a case where a plurality of first customer images are generated for the same customer, a plurality of different first customer images 302 are associated with a single payment information ID 304.

The generation unit 3040 associates payment information regarding a product purchased by the customer included in the first customer image with the first customer image. Specifically, the generation unit 3040 associates the first customer images generated between the start of a registration process for products and the termination of the registration process with payment information generated through the registration process.

Here, the generation unit 3040 may confirm with the sales clerk whether or not the association is correct, when associating the first customer image with the payment information. Specifically, the generation unit 3040 provides the first customer image to be associated with the payment information on a display apparatus viewed by the sales clerk operating the product registration apparatus 3000. The sales clerk confirms whether or not the provided first customer image is an image obtained by capturing a customer currently using the product registration apparatus 3000. When the provided first customer image is correct, the sales clerk inputs a fact that the first customer image is correct, by using a touch panel, a keyboard, or the like. The generation unit 3040 generates association information in response to the result of the input.

On the other hand, when the provided first customer image is not correct, the sales clerk performs processing for associating a correct customer image with the payment information. For example, the sales clerk captures the customer by operating the first image capture unit 3020 to thereby generate the first customer image again. The generation unit 3040 associates the first customer image generated by this operation with the payment information to thereby generate association information.

The generation unit 3040 stores the association information in a storage unit that can be accessed by the payment apparatuses 4000. The storage unit may be provided inside or outside the product registration apparatus 3000. A storage unit provided outside the product registration apparatus 3000 is, for example, a database server that can be accessed by the product registration apparatus 3000 and the payment apparatus 4000, or the like.

<With Regard to Payment Process Performed by Payment Apparatus 4000>

The payment apparatus 4000 acquires payment information and performs a payment process on the basis of the payment information. A well-known method can be used as a method of performing a payment process by the payment apparatus 4000 on the basis of information used for a process of paying for a product (payment information). This well-known method will not be described in detail.

<Details of Processing Performed by Second Image Capture Unit 4020>

The second image capture unit 4020 generates the second customer image (S202). A process of generating the second customer image by the second image capture unit 4020 is the same as a process of generating the first customer image by the first image capture unit 3020.

<Details of Processing Performed by First Calculation Unit 4040>

The first calculation unit 4040 calculates the first degree of similarity between the customer included in the first customer image captured by the first image capture unit 3020 and the customer included in the second customer image captured by the second image capture unit 4020 (S204). The first customer image that is a target to be calculated a degree of similarity by the first calculation unit 4040 is the first customer image associated with payment information in any association information. Hereinafter, the calculation of the degree of similarity will also be referred to as "matching between the first customer image and the second customer image".

There are various methods of calculating the first degree of similarity by the first calculation unit 4040. For example, the first calculation unit 4040 calculates a feature value of the customer included in each of the first customer image and the second customer image. The first calculation unit 4040 calculates a degree of similarity between feature values of the customers as the first degree of similarity. Here, various well-known methods used for matching between objects can be used as a method of extracting feature values of the objects from an image and a method of calculating a degree of similarity between the feature values. In addition, a method of calculating the first degree of similarity is not limited to a method using a feature value. Any of various well-known methods of calculating a degree of similarity between objects included in images can be used for the calculation of the first degree of similarity.

<<Method of Determining Target for Calculation of First Degree of Similarity>>

The first calculation unit 4040 may calculate the first degree of similarity with respect to all the first customer images associated with payment information, or may calculate the first degree of similarity with respect to a part of those first customer images. In the latter case, there are various methods of determining the first customer image that is a target to be calculated the first degree of similarity. Hereinafter, the methods will be described.

For example, the first calculation unit 4040 determines the first customer image that is a target to be calculated the first degree of similarity using points in time when the first customer images and the second customer image are captured. In general, a time is short between when a target of payment is registered by the product registration apparatus 3000 and a payment process is performed by the payment apparatus 4000. For example, the time is 5 minutes or shorter, or the like. Consequently, the first calculation unit 4040 handles, as a target to be calculated the first degree of similarity, only the first customer image captured before a predetermined time after a point in time when the second customer image that is a target to be calculated the first degree of similarity is generated. For example, the predetermined time is 5 minutes.

In addition, for example, the first calculation unit 4040 may determine the first customer image handled as a target to be calculated the first degree of similarity, on the basis of the arrangement of the product registration apparatus 3000 and the payment apparatus 4000. For example, as illustrated in FIG. 1, in a store where the payment system 2000 is introduced, a plurality of product registration apparatuses 3000 and a plurality of payment apparatuses 4000 are installed. When the registration of a product is terminated in the product registration apparatus 3000, a customer appropriately selects the payment apparatus 4000 to be used. In an operational environment of the payment system 2000, it is considered that the customer generally selects the payment apparatus 4000 close to the product registration apparatus 3000 having been used.

Consequently, the payment system 2000 previously stores information associating the product registration apparatus 3000 with the payment apparatus 4000 close to that product registration apparatus 3000, in a storage apparatus that can be accessed by the payment apparatus 4000. The first calculation unit 4040 handles, as a target to be calculated the first degree of similarity, only the first customer image generated in the product registration apparatus 3000 associated with the payment apparatus 4000 including this first calculation unit 4040.

For example, in a case of the example illustrated in FIG. 1, the payment system 2000 previously stores information associating the product registration apparatus 3000-1 with the payment apparatus 4000-1 and the payment apparatus 4000-2, and information associating the product registration apparatus 3000-2 with the payment apparatus 4000-3 and the payment apparatus 4000-4. The first calculation unit 4040 determines the first customer image handled as a target to be calculated the first degree of similarity, by using those pieces of information. For example, in a case of this example, the first calculation units 4040 included in the payment apparatus 4000-1 and the payment apparatus 4000-2 handles only the first customer image generated in the product registration apparatus 3000-1 as a target to be calculated the first degree of similarity. On the other hand, the first calculation units 4040 included in the payment apparatus 4000-3 and the payment apparatus 4000-4 handles only the first customer image generated in the product registration apparatus 3000-2 as a target to be calculated the first degree of similarity.

<<Method of Determining Region in which Customer is Included>>

The first calculation unit 4040 extracts a region indicating a customer using the product registration apparatus 3000 from the first customer image. Similarly, the first calculation unit 4040 extracts a region indicating a customer using the payment apparatus 4000 from the second customer image.

Any of various existing object recognition methods can be used as a method of extracting a person included in an image. The existing method will not be described in detail.

Here, a plurality of customers may be in a store. In this case, a customer other than the customer using the product registration apparatus 3000 may be included within the image capture range of the first image capture unit 3020. As a result, a plurality of customers may be included in the first customer image.

Consequently, the first calculation unit 4040 determines the customer using the product registration apparatus 3000 from the customers included in the first customer image, and calculates the first degree of similarity for the customer. The term "customer using the product registration apparatus 3000" as used herein means a customer purchasing a product indicated by payment information associated with the first customer image.

There are various methods of determining the customer using the product registration apparatus 3000. For example, the first calculation unit 4040 handles a customer included in the largest size, among the customers included in the first customer image, as the customer using the product registration apparatus 3000. In addition, for example, the first calculation unit 4040 handles a customer included at a position closest to the center of the first customer image, among the customers included in the first customer image, as the customer using the product registration apparatus 3000. Here, a well-known technique can be used as a method of performing comparison between sizes of customers included in an image and a method of performing comparison between the positions of the customers included in the image. Thus, these methods will not be described.

Note that the first customer image may be generated as an image indicating only a customer using the product registration apparatus 3000 by the first image capture unit 3020. In this case, the first image capture unit 3020 determines the customer using the product registration apparatus 3000, for example, by using the same method as that used for the first calculation unit 4040. The first image capture unit 3020 generates the first customer image by using only a region indicating the customer using the product registration apparatus 3000 among the images recorded in the image capture element.

In addition, for example, when the first customer image is generated, a sales clerk operating the product registration apparatus 3000 may specify a region in which the customer is included. In this case, the first image capture unit 3020 displays the entire image recorded in the image capture element on a display apparatus viewed by the sales clerk operating the product registration apparatus 3000. The sales clerk performs input on the image displayed the display apparatus for specifying a region in which the customer using the product registration apparatus 3000 is included. For example, in a case where the display apparatus includes a touch panel, the sales clerk traces with a finger to surround the region in which the customer is included, thereby specifying the region in which the customer is include. The first image capture unit 3020 generates an image indicating the region specified by the sales clerk as the first customer image. Note that, in a case where an image of the customer is captured a plurality of times, for example, the first image capture unit 3020 displays an image with the least blur, among the images recorded in the image capture element, on the display apparatus.

Note that, similarly, a plurality of customers may be included in the second customer image. In this case, for example, the first calculation unit 4040 extracts a customer using the payment apparatus 4000 through the same processing as the processing for the first customer image. In addition, the second customer image may be generated as an image from which the customer using the payment apparatus 4000 is extracted, by the second image capture unit 4020. The generation method is the same as the method of generating the first customer image including only the customer using the product registration apparatus 3000 by the first image capture unit 3020. In addition, the payment apparatus 4000 may cause the customer using the payment apparatus 4000 to perform input for specifying the customer using the payment apparatus 4000, by using the same method as a method of causing a sales clerk to specify a customer by the product registration apparatus 3000.

<Details of Processing Performed by Acquisition Unit 4060>

In a case where there is the first customer image satisfying a matching condition (the first degree of similarity is equal to or greater than the first threshold value) (S206: YES), the acquisition unit 4060 acquires payment information associated with the first customer image (S208). Specifically, the acquisition unit 4060 determines the first customer image having the first degree of similarity equal to or greater than the first threshold value among first customer images for which the first degree of similarity is calculated. The acquisition unit 4060 acquires payment information associated with the determined first customer image by using association information. Specifically, the acquisition unit 4060 has access to the storage unit in which the association information is recorded by the generation unit 3040, and acquires payment information indicated by association information in which the determined customer image is indicated.

Note that a case where there are a plurality of first customer images having the first degree of similarity equal to or greater than the first threshold value is considered. For example, in this case, the acquisition unit 4060 acquires payment information associated with the first customer image having the highest first degree of similarity. In addition, in this case, the payment apparatus 4000 may display the first customer images having the first degree of similarity equal to or greater than the first threshold value on the display apparatus 20 so that a customer selects one of the first customer images. The acquisition unit 4060 acquires payment information associated with the first customer image selected by the customer. By these methods, even when there are a plurality of first customer images satisfying the matching condition, it is possible to uniquely determine and acquire payment information regarding a product purchased by the customer using the payment apparatus 4000.

Here, a method of displaying the first customer image having the first degree of similarity equal to or greater than the first threshold value on the display apparatus 20 and a method of receiving the selection of the displayed first customer image are respectively the same as a process of displaying a candidate image on the display apparatus 20 by the first display control unit 4080 and a method of receiving the selection of the displayed candidate image by the first input reception unit 4100. The process of displaying a candidate image on the display apparatus 20 by the first display control unit 4080 and the method of receiving the selection of the displayed candidate image by the first input reception unit 4100 will be described later in detail.

<Details of Processing Performed by First Display Control Unit 4080>

In a case where there is no first customer image including a customer having the first degree of similarity to the customer (customer using the payment apparatus 4000)

included in the second customer image equal to or greater than the first threshold value, the first display control unit 4080 controls a display apparatus (S210). Specifically, the first display control unit 4080 displays a candidate (candidate image) of the first customer image in which the same customer as the customer included in the second customer image is included, among first customer images, on the display apparatus 20.

Figure 9A:
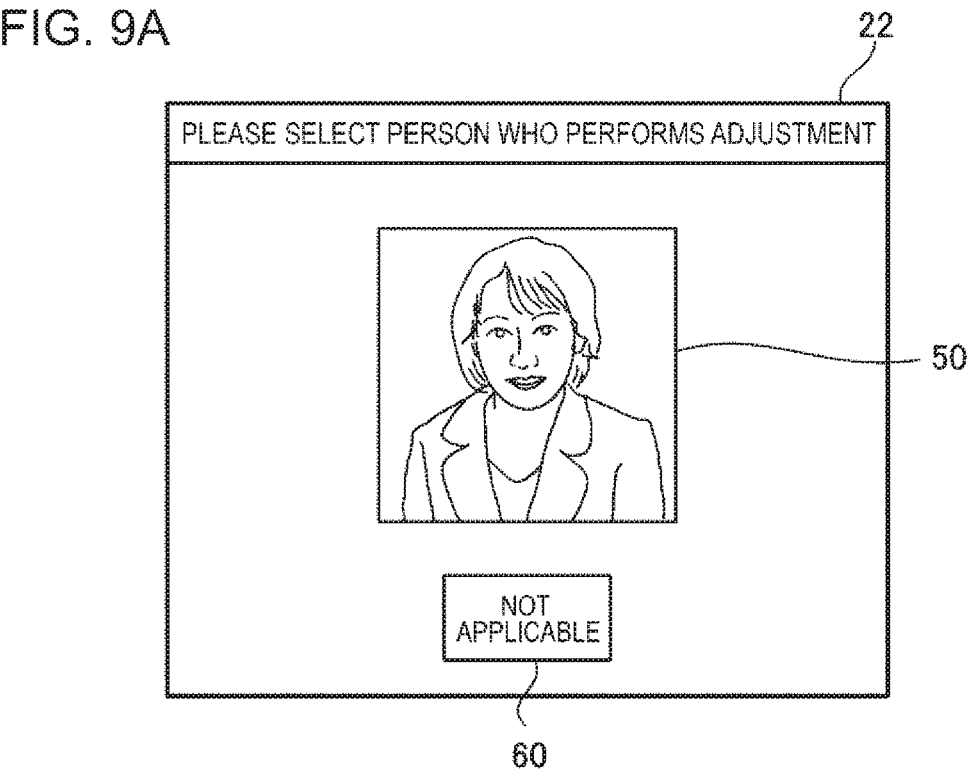
FIGS. 9A and 9B are diagrams illustrating displays
Figure 9B:
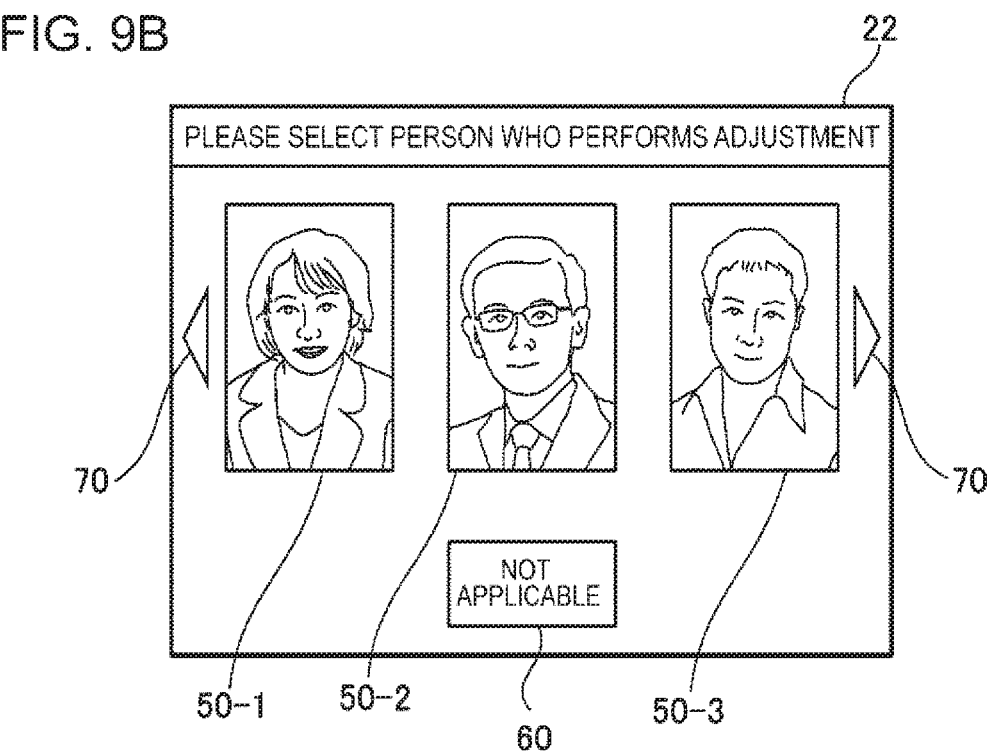

FIG. 9 is a diagram illustrating display in the display apparatus 20. In FIG. 9A, the first display control unit 4080 displays one candidate image 50 on the touch panel 22 of the display apparatus 20. On the other hand, in FIG. 9B, the first display control unit 4080 displays three candidate images 50 on the touch panel 22 of the display apparatus 20. Note that, in a case where there are a large number of customers the images of which are captured by the first image capture unit 3020, the first display control unit 4080 displays a button 70 on the touch panel 22. When the customer presses the button 70, the first display control unit 4080 displays the candidate image 50 which is not currently displayed on the touch panel 22.

<<Method of Determining Candidate Image>>

As described above, a candidate image is a candidate of the first customer image including the same customer as the customer included in the second customer image. In order to display the candidate image, the first display control unit 4080 determines which first customer image to handle as a candidate image. Any of various methods is used as this method. Hereinafter, the method will be specifically described.

For example, the first display control unit 4080 determines a candidate image by using a predetermined second threshold value smaller than the first threshold value. Specifically, in a case where it is necessary to display a candidate image (in a case where there is no first customer image satisfying a matching condition), the first display control unit 4080 handles the first customer image having the first degree of similarity equal to or greater than the second threshold value with respect to the customer included in the second customer image, as the candidate image. The second threshold value is smaller than the first threshold value. Therefore, according to this method, the first customer image having the first degree of similarity equal to or greater than the second threshold value and less than the first threshold value is determined to be the candidate image.

In addition, for example, the first display control unit 4080 determines a candidate image by using a second degree of similarity which is calculated by a method different from that for the first degree of similarity. Specifically, in a case where it is necessary to display a candidate image (in a case where there is no first customer image satisfying a matching condition), the first calculation unit 4040 calculates the second degree of similarity between the second customer image and the first customer image by using a method different from the method of calculating the first degree of similarity. The first display control unit 4080 handles first customer images having the calculated second degree of similarity equal to or greater than the first threshold value as candidate images.

Here, in a case where the second degree of similarity is equal to or greater than the first threshold value, the second degree of similarity has a value greater than the first degree of similarity. This is because the first degree of similarity is smaller than the first threshold value in a case where the second degree of similarity is calculated. Consequently, it is preferable that an algorithm for calculating a higher degree of similarity than an algorithm for calculating the first degree of similarity is used as an algorithm for calculating the second degree of similarity. Here, various types of algorithms are used as an algorithm for calculating degrees of similarity of objects included in images, and the values of the calculated degrees of similarity are different from each other. Consequently, for example, an algorithm for calculating the first degree of similarity and an algorithm for calculating the second degree of similarity are appropriately adopted from these well-known algorithms so that the second degree of similarity becomes larger than the first degree of similarity.

Note that the first display control unit 4080 may display all the candidate images determined by the above-described methods, or may display only a portion of the candidate images. In the latter case, for example, the first display control unit 4080 uses the above-described association between the product registration apparatus 3000 and the payment apparatus 4000. Specifically, the first display control unit 4080 displays only a candidate image generated on the basis of payment information associated with the payment apparatus 4000 including the first display control unit 4080 among the candidate images.

In addition, the first display control unit 4080 may determine the order in which the candidate images are displayed, by using the above-described association between the product registration apparatus 3000 and the payment apparatus 4000. Specifically, the first display control unit 4080 displays a candidate image generated by the product registration apparatus 3000 associated with the payment apparatus 4000 including this first display control unit 4080 prior to a candidate image generated by the product registration apparatus 3000 which is not associated with this payment apparatus 4000.

<Details of Processing Performed by First Input Reception Unit 4100>

The first input reception unit 4100 receives an input for selecting one of displayed candidate images (S212). Any of various well-known techniques for receiving the selection of an image, a button, or the like displayed on a display can be used as a method of receiving the selection of a candidate image. In a case where a display apparatus includes a touch panel and the first input reception unit 4100 displays a candidate image on the touch panel, for example, the first input reception unit 4100 detects the pressing of the candidate image displayed on the touch panel to thereby receive the selection of the candidate image. In a case of FIG. 9, a customer presses any candidate image 50 to thereby select the candidate image 50. In addition, for example, the first input reception unit 4100 may receive the selection of a candidate image by using an input device such as a keyboard.

In a case where the first input reception unit 4100 has received the selection of a candidate image, the acquisition unit 4060 acquires payment information associated with the selected candidate image (first customer image) by using association information (S214). A method of acquiring payment information associated with the first customer image is as described above.

<With Regard to Other Functions>

Figure 10:
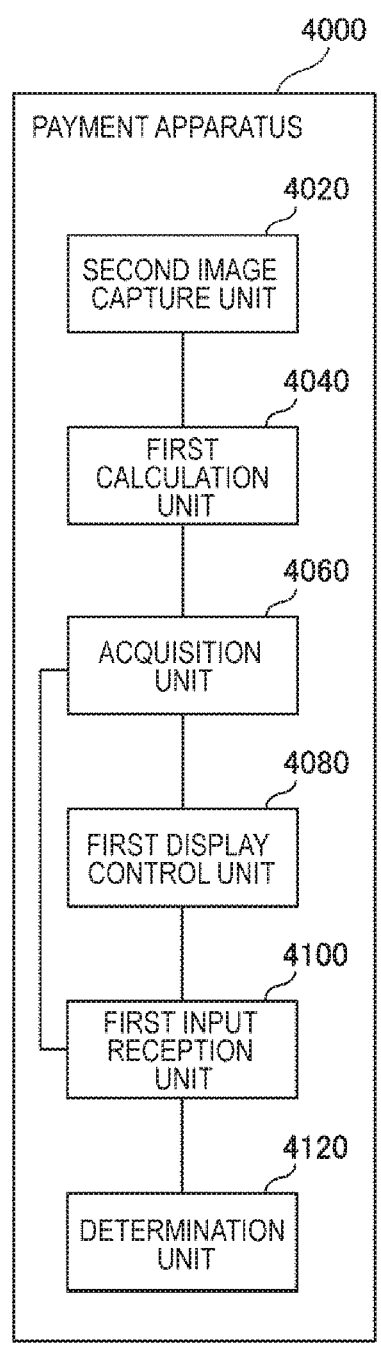
FIG. 10 is a block diagram illustrating the payment apparatus including a determination unit.

The payment apparatus 4000 may further include a determination unit 4120. FIG. 10 is a block diagram illustrating the payment apparatus 4000 including the determination unit 4120. In a case where the first input reception unit 4100 does not receive an operation of selecting a candidate image (in a case where a customer does not select a candidate image), the determination unit 4120 determines that there is no first customer image including the same customer as the customer included in the second customer image. For example, in a case of the example illustrated in FIG. 9, in a case where a customer presses a button 60, or does not press the candidate image 50 or other buttons for a predetermined time or longer, the determination unit 4120 determines that the first input reception unit 4100 does not receive the selection of a candidate image. In addition, even when there is no candidate image to be displayed by the first display control unit 4080, the determination unit 4120 determines that there is no first customer image including the same customer as the customer included in the second customer image. Here, the case where there is no candidate image to be displayed by the first display control unit 4080 is a case where there is no first customer image having the second degree of similarity equal to or greater than the first threshold value, a case where there is no first customer image having the first degree of similarity equal to or greater than a second threshold value, or the like, for example, in the above-described method of determining a candidate image.

In a case where the determination unit 4120 determines that "there is no first customer image including the same customer as the customer included in the second customer image", the payment apparatus 4000 performs various processes. For example, the first display control unit 4080 displays a message of expressing that there is no payment information corresponding to the customer, and the like on the display apparatus. In addition, for example, the payment apparatus 4000 may reset the second customer image and the like again. That is, the payment apparatus 4000 performs the processing of FIG. 4 again. Thereby, the calculation of a degree of similarity, and the like are performed using the second customer image generated by newly capturing the customer. In this manner, the customer can more reliably perform payment.

Second Example Embodiment

Figure 11:
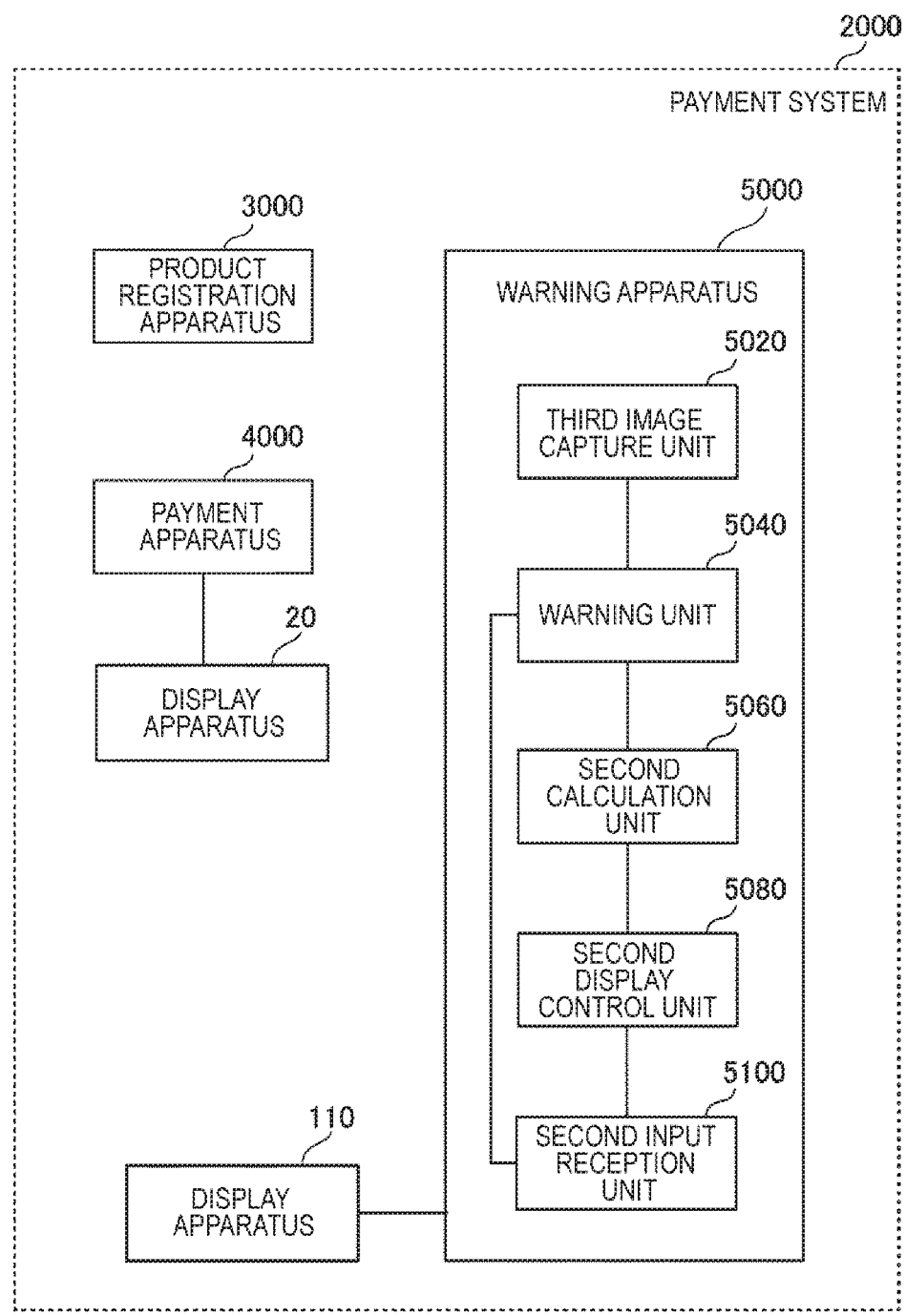
FIG. 11 is a block diagram illustrating a payment system according to a second example embodiment.

FIG. 11 is a block diagram illustrating a payment system 2000 according to a second example embodiment. In FIG. 11, each block represents a function-based configuration instead of a hardware-based configuration.

The payment system 2000 according to the second example embodiment has a function of performing warning processing in a case where a customer attempting to leave an area in which a payment apparatus 4000 is installed has not terminated a payment process. For this reason, the payment system 2000 according to the second example embodiment is configured as follows.

Association information generated by a generation unit 3040 according to the second example embodiment further indicates a completion flag. The completion flag indicates whether or not payment using payment information indicated by the association information has been completed. That is, the generation unit 3040 according to the second example embodiment generates the association information in which the first customer image, the payment information, and the completion flag are associated with each other.

Figure 12:
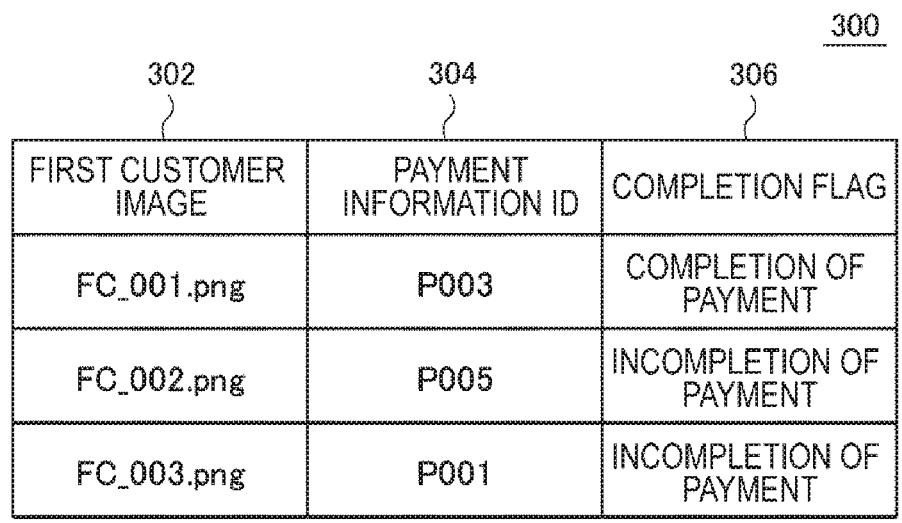
FIG. 12 is a diagram illustrating association information according to the second example embodiment.

Hereinafter, it is assumed that the value of a completion flag indicating the completion of payment is "completion of payment" and the value of a completion flag indicating the incompletion of payment is "incompletion of payment". FIG. 12 is a diagram illustrating an association information 300 according to the second example embodiment. The association information 300 further includes a completion flag 306, in addition to a first customer image 302 and a payment information ID 304.

The payment system 2000 according to the second example embodiment further includes a warning apparatus 5000. The warning apparatus 5000 includes a third image capture unit 5020, a warning unit 5040, a second calculation unit 5060, a second display control unit 5080, and a second input reception unit 5100. The third image capture unit 5020 performs image capture to thereby generate an image including a customer located at an exit of an area (hereinafter, also simply referred to as an "exit") in which the payment apparatus 4000 is installed. Hereinafter, the image generated by the third image capture unit 5020 will be referred to as a third customer image.

The warning unit 5040 performs warning processing in a case where a warning condition is satisfied. The warning condition is that "a completion flag associated with the first customer image, which includes the same customer as the customer included in the third customer image, indicates the incompletion of payment". The warning unit 5040 determines whether or not the warning condition is satisfied, on the basis of results of processes performed by the second calculation unit 5060, the second display control unit 5080, and the second input reception unit 5100.

The second calculation unit 5060 calculates a third degree of similarity between the customer included in the third customer image and a customer included in each first customer image. In a case where there is the first customer image including a customer having a third degree of similarity equal to or greater than a predetermined third threshold value, the warning unit 5040 handles the first customer image to be the first customer image including the same customer as the customer included in the third customer image. Consequently, the warning unit 5040 determines that the warning condition is satisfied in a case where a completion flag associated with the first customer image indicates the incompletion of payment. Note that the third threshold value may be the same as or different from the first threshold value or the second threshold value.

The second display control unit 5080 displays a second candidate image on a display apparatus 110 viewable by a sales clerk in a case where there is no first customer image including a customer having a third degree of similarity equal to or greater than the third threshold value. The second candidate image is a candidate of the first customer image including the same customer as the customer included in the third customer image.

The second input reception unit 5100 receives an input for selecting a second candidate image. The warning unit 5040 handles the second candidate image selected through the second input reception unit 5100 as the first customer image including the same customer as the customer included in the third customer image. Consequently, the warning unit 5040 determines that the warning condition is satisfied in a case where a completion flag associated with the first customer image indicates the incompletion of payment.

<Flow of Processing>

Figure 13:
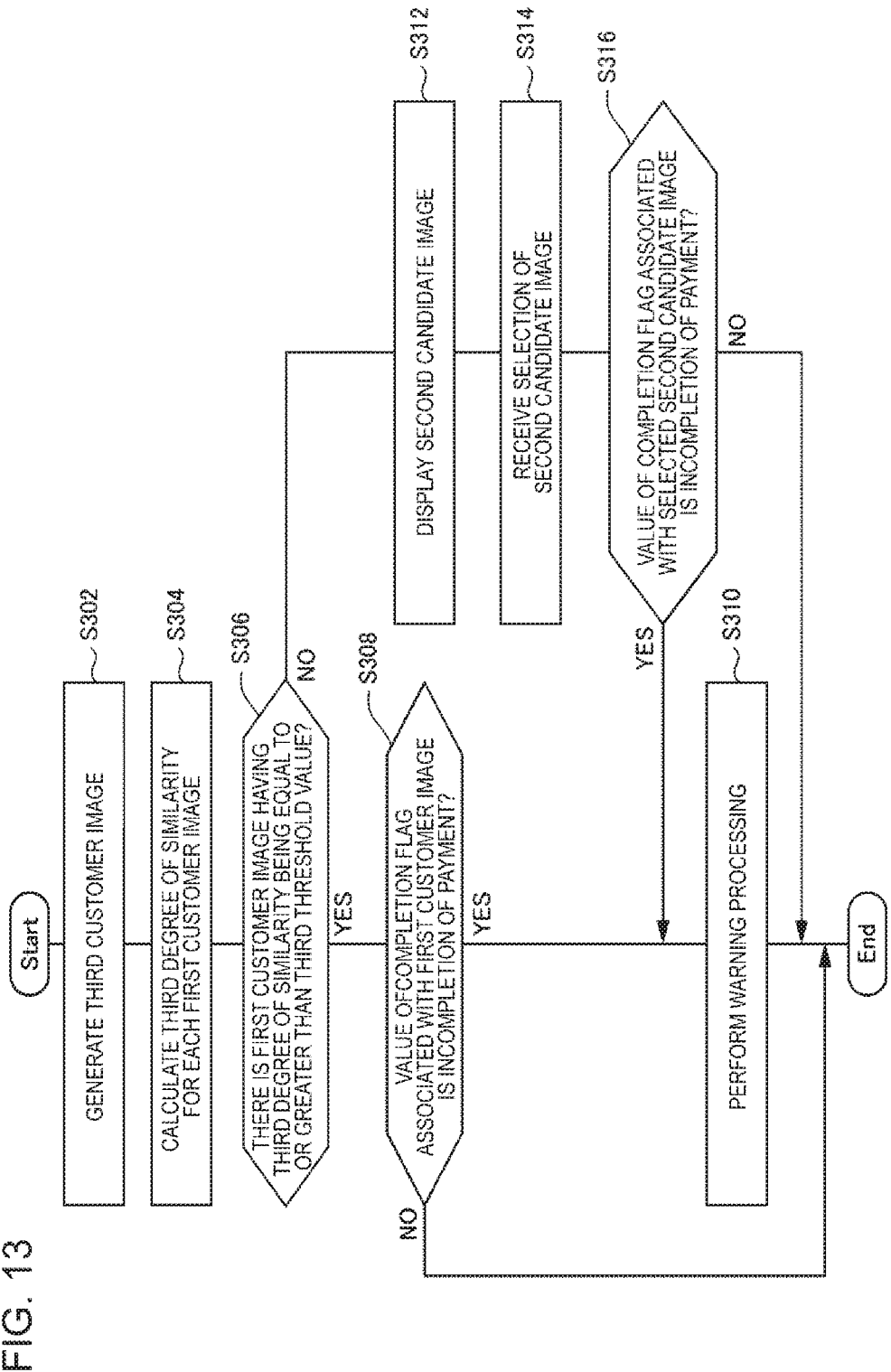
FIG. 13 is a flow chart illustrating a flow of processing performed by a warning apparatus according to the second example embodiment.

FIG. 13 is a flow chart illustrating a flow of processing performed by the warning apparatus 5000 according to the second example embodiment. The third image capture unit 5020 captures a customer located at an exit to thereby generate the third customer image (S302). The second calculation unit 5060 calculates a third degree of similarity for each first customer image (S304). The warning unit 5040 determines whether or not there is the first customer image including a customer having a third degree of similarity equal to or greater than the third threshold value (S306). In a case where there is the first customer image including a customer having a third degree of similarity equal to or greater than the third threshold value (S306: YES), the processing of FIG. 13 proceeds to S308. On the other hand, in a case where there is no first customer image including a customer having a third degree of similarity equal to or greater than the third threshold value (S306: NO), the processing of FIG. 13 proceeds to S312.

In S308, the warning unit 5040 determines "whether or not a completion flag associated with the first customer image, which includes a customer having a third degree of similarity equal to or greater than the third threshold value, indicates the incompletion of payment (whether or not a warning condition is satisfied)". In a case where the warning condition is satisfied (S308: YES), the warning unit 5040 performs warning processing (S310). In a case where the warning condition is not satisfied (S308: NO), the processing of FIG. 13 is terminated.

In S312, the second display control unit 5080 displays a second candidate image on the display apparatus 110. The second input reception unit 5100 receives an input for selecting the second candidate image (S314).

The warning unit 5040 determines "whether or not a completion flag associated with the selected second candidate image indicates the incompletion of payment (whether or not a warning condition is satisfied)" (S316). In a case where the warning condition is satisfied (S316: YES), the processing of FIG. 13 proceeds to S310. On the other hand, in a case where the warning condition is not satisfied (S316: NO), the processing of FIG. 13 is terminated.

<Example of Hardware Configuration>

For example, the warning apparatus 5000 is realized by a computer having the same hardware configuration as that of the computer realizing the product registration apparatus 3000 or the payment apparatus 4000. Hardware (for example, a camera) constituting the third image capture unit 5020 is connected to an input and output interface of the computer. The third image capture unit 5020 is provided in the vicinity of an exit. For example, the third image capture unit 5020 is provided on a ceiling in the vicinity of the exit. In addition, for example, in a case where the exit is provided with a gate through which a customer passes, the third image capture unit 5020 may be provided at the gate. However, as long as the third image capture unit 5020 is able to capture the customer located at the exit, the installation place thereof is not limited to the above-described example. In other respects, the third image capture unit 5020 is implemented in the same manner as a first image capture unit 3020 or a second image capture unit 4020.

The display apparatus 110 is connected to an input and output interface of the computer realizing the warning apparatus 5000. The display apparatus 110 is provided in the vicinity of the exit. In addition, the display apparatus 110 is installed so as to be viewable by a sales clerk.

An input device for realizing the second input reception unit 5100 is connected to the input and output interface of the computer realizing the warning apparatus 5000. For example, the input device is a touch panel embedded in the display apparatus 110. In addition, for example, the input device may be a keyboard, a mouse, or the like.

A storage of the computer realizing the warning apparatus 5000 includes program modules for respectively realizing the third image capture unit 5020, the warning unit 5040, the second calculation unit 5060, the second display control unit 5080, and the second input reception unit 5100. A processor of the computer realizing the warning apparatus 5000 executes the program modules to thereby realize functions of these functional configuration units.

<Details of Processing Performed by Second Calculation Unit 5060>

The second calculation unit 5060 calculates a third degree of similarity between a customer included in each first customer image and the customer included in the third customer image (S304). An algorithm used for the calculation of the third degree of similarity may be the same as or different from the algorithm for calculating the first degree of similarity or the second degree of similarity.

The first customer image which is a target for calculating the third degree of similarity is the first customer image associated with payment information in any association information. The second calculation unit 5060 acquires each first customer image by using the same method as the method of acquiring each first customer image associated with payment information in association information by the first calculation unit 4040.

<Details of Processing Performed by Second Display Control Unit 5080>

In a case where there is no first customer image having the third degree of similarity equal to or greater than the third threshold value (S306: NO), the second display control unit 5080 displays a second candidate image (first customer image representing a candidate of the customer included in the third customer image) on the display apparatus 110 viewable by a sales clerk (S312). Here, a method of determining which first customer image to handle as the second candidate image is the same as the method of determining a candidate image in the first example embodiment. Hereinafter, this method will be specifically described.

For example, the second calculation unit 5060 calculates a fourth degree of similarity between the customer included in the first customer image and the customer included in the third customer image, by using a method different from the method of calculating the third degree of similarity. The second display control unit 5080 displays the first customer image having the fourth degree of similarity equal to or greater than the third threshold value as a second candidate image.

Here, it is preferable that an algorithm for calculating the fourth degree of similarity calculates a higher degree of similarity than that of an algorithm for calculating the third degree of similarity for the same reason as a reason it is preferable that the algorithm for calculating the second degree of similarity calculates a higher degree of similarity than that of the algorithm for calculating the first degree of similarity. For example, the second calculation unit 5060 uses the same algorithm as the algorithm for calculating the first degree of similarity as the algorithm for calculating the third degree of similarity, and uses the same algorithm as the algorithm for calculating the second degree of similarity as the algorithm for calculating the fourth degree of similarity.

In addition, for example, the second display control unit 5080 may display the first customer image having a third degree of similarity equal to or greater than the fourth threshold value as a second candidate image. The fourth threshold value is smaller than the third threshold value.

<Details of Processing Performed by Second Input Reception Unit 5100>

The second input reception unit 5100 receives a process of selecting a second candidate image (S314). The selection of the second candidate image is performed by a sales clerk. A method of receiving the selection of the second candidate image by the second input reception unit 5100 is the same as the method of receiving the selection of a candidate image by the first input reception unit 4100.

<Details of Processing Performed by Warning Unit 5040>

The warning unit 5040 performs warning processing in a case where a warning condition is satisfied (S310). As described above, the warning condition is that "a completion flag associated with the first customer image, which includes the same customer as the customer included in the third customer image, indicates the incompletion of payment". Here, the warning unit 5040 handles 1) the first customer image having a third degree of similarity equal to or greater than the third threshold value or 2) a second candidate image selected by a customer as the "first customer image including the same customer as the customer included in the third customer image". Here, 1) and 2) are as described above.

The warning unit 5040 has access to a storage unit storing association information to thereby acquire a completion flag associated with the "first customer image including the same customer as the customer included in the third customer image". The warning unit 5040 determines whether or not the value of the completion flag indicates the incompletion of payment.

<<Details of Warning Processing>>

There are various warning processings to be performed by the warning unit 5040. For example, the warning unit 5040 outputs an alarm sound at a place where a customer is captured by the first image capture unit 3020, a sales clerk, a security officer, or the like can listen to the alarm sound. For example, this place is the vicinity of the exit, the vicinity of the product registration apparatus 3000, a security office, or the like. In this case, a speaker or the like outputting the alarm sound is installed at the place where the alarm sound is output.

In addition, for example, the warning unit 5040 displays a warning message to express that payment has not completed, at a place where a customer is captured by the third image capture unit 5020, a sales clerk, a security officer, or the like can view the warning message. Specifically, the warning unit 5040 displays the warning message on the display apparatus 110 provided at the exit, the display apparatus 20 provided in each product registration apparatus 3000, a display apparatus provided in the security office, or the like.

In addition, in a case where a gate is installed at the exit, the warning unit 5040 may perform a process of closing the gate in a case where a warning condition is satisfied. In this manner, a customer cannot pass the exit, and thus it is possible to prevent the customer having not performed payment from leaving by mistake.

In addition, a membership system is introduced in a store operating the payment system 2000, the warning unit 5040 may give warning by using member information. Specifically, it is assumed that an image (face photo or the like) of a member and a contact address (mail address or the like) of the member are registered as the member information in advance. In a case where the warning condition is satisfied, the warning unit 5040 has access to a database or the like storing the member information and retrieves the image of the member including the same customer as the customer included in the third customer image. In a case where there is such an image, the warning unit 5040 transmits the warning message to the contact address of the customer indicated by the member information indicated by the image. For example, the warning unit 5040 transmits a mail including the warning message to the customer's mail address. It is possible to directly give the warning message to the customer by using the member information. Thus, even when the customer forgets to perform payment and leaves the exit by mistake, it is possible to give warning to the customer so that other people cannot be conscious of the customer's leaving. Accordingly, it is possible to protect the customer's privacy.

Specific Example

Figure 14:
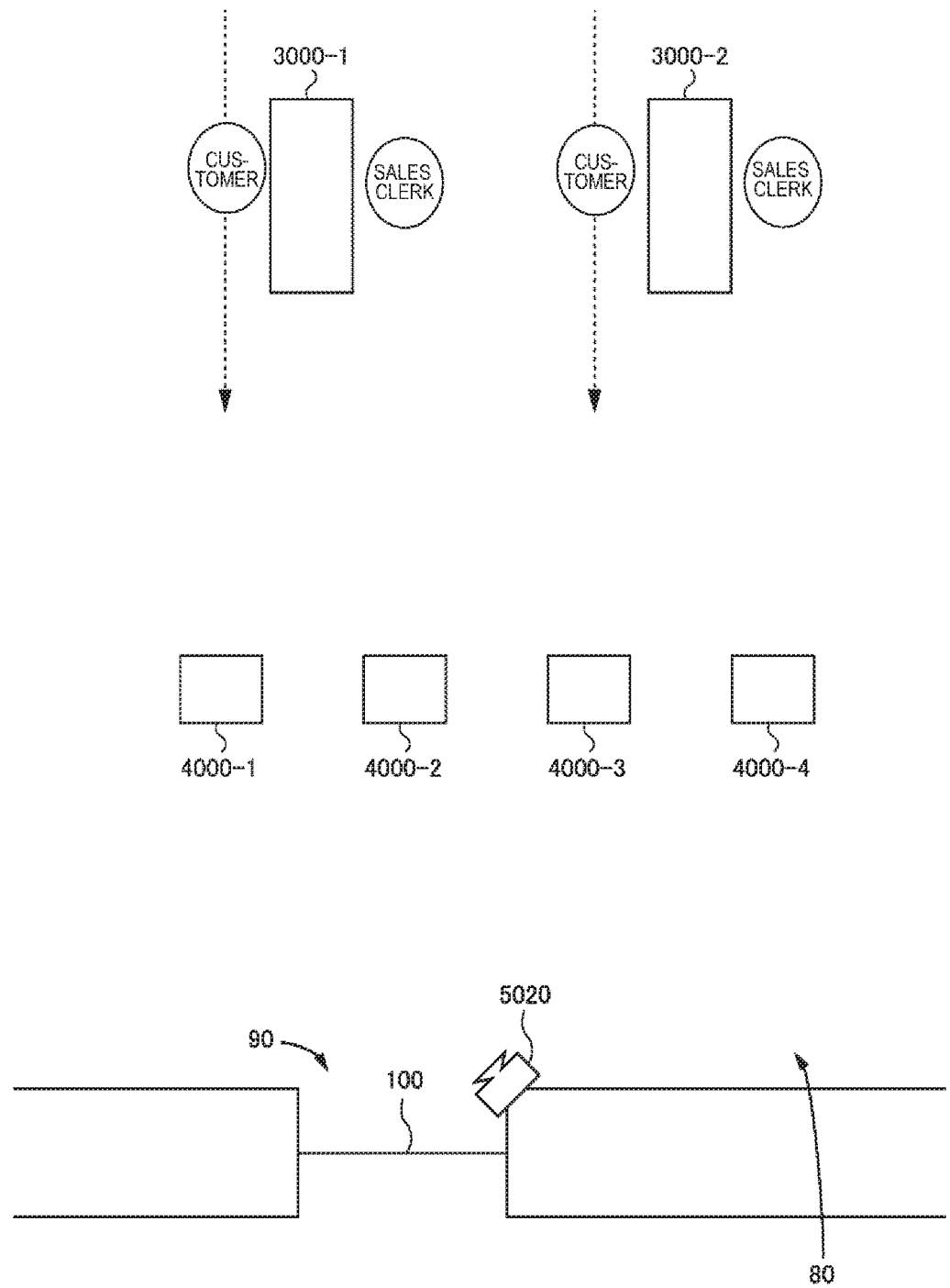
FIG. 14 is a diagram illustrating an operational environment of the payment system according to the second example embodiment.

The operation of the payment system 2000 according to the second example embodiment will be specifically described below. FIG. 14 is a diagram illustrating an operational environment of the payment system 2000 according to the second example embodiment. In FIG. 14, the payment apparatus 4000 is installed in an area 80. An exit 90 is an exit of the area 80. A gate 100 is a gate through which a customer passes when leaving the exit 90. In FIG. 14, the third image capture unit 5020 is provided at the gate 100.

In general, a customer uses the product registration apparatus 3000 and then performs payment by using the payment apparatus 4000. The payment apparatus 4000 changes the value of a completion flag associated with the first customer image selected by the customer through the input reception unit 4100 to "completion of payment" when the customer's payment is completed.

When the customer passes through the gate 100, the third image capture unit 5020 captures the customer to thereby generate the third customer image. The warning unit 5040 determines whether or not the completion flag associated with the first customer image including the same customer as the customer included in the third customer image indicates "incompletion of payment". As described above, when the customer has completed the payment, the completion flag indicates "completion of payment". Thus, the warning unit 5040 does not perform warning processing.

On the other hand, when the customer does not perform payment, the completion flag associated with the first customer image including the same customer as the customer included in the third customer image indicates "incompletion of payment". In this case, the warning unit 5040 performs warning processing. For example, the warning unit 5040 closes the gate 100 and displays a warning message on a display apparatus provided at the gate 100.

<Advantageous Effect>

The payment system 2000 according to this example embodiment performs warning processing in a case where the completion flag associated with the "first customer image including the same customer as the customer included in the third customer image" indicates the incompletion of payment. This means that warning is given in a case where the customer attempts to leave the exit before paying a product to be purchased (or in a case where the customer leaves the exit). Therefore, according to the payment system 2000 according to this example embodiment, it is possible to prevent the customer from forgetting to perform payment and leaving, and thus trouble occurring between the customer and the store can be prevented beforehand.

In addition, in a case where there is no first customer image having the third degree of similarity equal to or greater than the third threshold value, the warning apparatus 5000 displays the second candidate image to make a sales clerk viewing the display apparatus 110 select the second candidate image. For example, there may be a difference in the customer's belongings between when the customer uses the product registration apparatus 3000 and when the customer passes the exit. Specifically, it is possible to consider a case where the customer having worn a mask when using the product registration apparatus 3000 takes off the mask before passing the exit. In this case, although the first customer image including the same customer as the customer included in the third customer image is actually present, the third degree of similarity therebetween becomes low. Accordingly, even when the customer having not completed payment passes the exit, warning is not given.

According to the warning apparatus 5000 of this example embodiment, the second candidate image is displayed in a case where there is no first customer image having the third degree of similarity equal to or greater than the third threshold value, and thus a sales clerk can visually determine whether or not there is the second candidate image including the same customer as the customer attempting to pass the exit. In a case where there is the second candidate image including the same customer as the customer attempting to pass the exit when viewed from the eyes of the sales clerk, the sales clerk selects the second candidate image, and thus the warning apparatus 5000 determines whether or not payment based on payment information associated with the second candidate image has been completed. The warning apparatus 5000 performs warning processing in a case where the payment has not been completed. Accordingly, the warning apparatus 5000 according to this example embodiment can more reliably prevent the customer from forgetting to perform payment and leaving, by also using a person's determination.

As described above, the example embodiments of the invention have been described with reference to the accompanying drawings, but are illustrative of the invention. A combination of the above-described example embodiments or various configurations other than the above-described configurations can also be adopted.

Hereinafter, an example of a reference configuration will be appended.

1. A payment system including a product registration apparatus and a payment apparatus,
    wherein the product registration apparatus includes:
    a first image capture unit generating a first customer image including a customer, and
    a generation unit generating association information that associates payment information used for payment of a product with the first customer image, and
    wherein the payment apparatus includes:
    a second image capture unit generating a second customer image including a customer, and a first display control unit displaying a candidate image on a display apparatus viewable by the customer, the candidate image being a candidate of the first customer image that includes the same customer as the customer included in the second customer image.

2. The payment system according to 1, further including:
    a first calculation unit calculating a first degree of similarity between the customer included in the second customer image and the customer included in respective first customer images; and
    an acquisition unit acquiring, in a case where there is the first customer image including the customer having the first degree of similarity to the customer included in the second customer image that is equal to or greater than the first threshold value, the payment information associated with that first customer image,
    wherein the first display control unit displays the candidate image in a case where there is no first customer image including the customer having the first degree of similarity to the customer included in the second customer image that is equal to or greater than the first threshold value.

3. The payment system according to 2,
    wherein the payment apparatus includes an input reception unit receiving a selection operation for the candidate image,
    wherein the acquisition unit acquires the payment information associated with the selected candidate image.

4. The payment system according to 3, wherein the payment apparatus includes a determination unit determining that there is no first customer image including the same customer as the customer included in the second customer image, in a case where the candidate image is not selected.

5. The payment system according to any one of 2 to 4,
    wherein the first calculation unit calculates a second degree of similarity between the customer included in the second customer image and the customer included in respective first customer images by using a method different from a method of calculating the first degree of similarity, in a case where there is no first customer image including the customer having the first degree of similarity to the customer included in the second customer image that is equal to or greater than the first threshold value, and
    wherein the first display control unit displays the first customer image including the customer having the second degree of similarity to the customer included in the second customer image that is equal to or greater than the first threshold value, as the candidate image.

6. The payment system according to any one of 2 to 4,
    wherein the first display control unit displays the first customer image including the customer having the first degree of similarity with respect to the customer included in the second customer image equal to or greater than a second threshold value smaller than the first threshold value, in a case where there is no first customer image in which the customer having the first degree of similarity to the customer included in the second customer image equal to or greater than the first threshold value is seen.

7. The payment system according to any one of 1 to 4,
    wherein the payment system includes a plurality of the product registration apparatuses and a plurality of the payment apparatuses, and
    wherein the first display control unit displays the first customer image generated by the product registration apparatus associated with the payment apparatus including the first display control unit, as the candidate image.

8. The payment system according to any one of 2 to 6,
    wherein the generation unit generates the association information further indicating a captured time of the first customer image, and
    wherein the first calculation unit calculates a degree of similarity for the first customer image the captured time of which is different from a current time by less than a predetermined time.

9. The payment system according to any one of 1 to 8,
    wherein the generation unit further associates a completion flag indicating whether or not payment using the payment information indicated by the association information has been completed, in that association information, and
    wherein the payment system includes a warning apparatus including:
    a third image capture unit generating a third customer image including a customer located at an exit of an area in which the payment apparatus is installed; and
    a warning unit performing a warning processing in a case where the completion flag, associated with the first customer image including the same customer as the customer included in the third customer image, indicates that the payment using the payment information has not been completed.

10. The payment system according to 9,
    wherein the warning apparatus includes a second calculation unit calculating a third degree of similarity between the customer included in the third customer image and the customer included in respective first customer image, wherein the warning unit handles, in a case where there is the first customer image including the customer having the third degree of similarity equal to or greater than a third threshold value, that first customer image as the first customer image including the same customer as the customer included in the third customer image, wherein the warning apparatus includes:

a second display control unit displaying, on the display apparatus provided at the exit, a second candidate image that is a candidate of the first customer image including the same customer as the customer included in the third customer image, in a case where there is no first customer image including the customer having the third degree of similarity equal to or greater than the third threshold value; and a second input reception unit receiving an input for selecting the second candidate image, and wherein the warning unit handles the second candidate image selected through the second input reception unit as the first customer image including the same customer as the customer included in the third customer image, in a case where there is no first customer image including the customer having the third degree of similarity equal to or greater than the third threshold value.

11. The payment system according to 10, wherein the second calculation unit calculates a fourth degree of similarity between the customer included in the third customer image and the customer included in respective first customer images by using a method different from the method of calculating the third degree of similarity, in a case where there is no first customer image including the customer having the third degree of similarity equal to or greater than the third threshold value, and wherein the second display control unit displays the first customer image including the customer having the fourth degree of similarity equal to or greater than the third threshold value, as the second candidate image.

12. The information processing system according to 10, wherein the second display control unit displays the first customer image including the customer having the third degree of similarity equal to or greater than a fourth threshold value smaller than the third threshold value, as the second candidate image.

13. A payment apparatus included in the information processing system according to any one of 1 to 12.

14. A program causing a computer to operate the payment apparatus according to 13.

15. A payment method performed in a payment system including a product registration apparatus and a payment apparatus, the payment method including:

a first image capture step of causing the product registration apparatus to generate a first customer image including a customer;

a generation step of causing the product registration apparatus to generate association information that associates payment information used for payment of a product with the first customer image;

a second image capture step of causing the payment apparatus to generate a second customer image including a customer; and a first display control step of causing the payment apparatus to display a candidate image on a display apparatus viewable by the customer, the candidate image being a candidate of the first customer image that includes the same customer as the customer included in the second customer image.

16. The payment method according to 15, further including:

a first calculation step of causing the payment apparatus to calculate a first degree of similarity between the customer included in the second customer image and the customer included in respective first customer images; and an acquisition step of causing the payment apparatus to acquire, in a case where there is the first customer image including the customer having the first degree of similarity to the customer included in the second customer image that is equal to or greater than the first threshold value, the payment information associated with that first customer image, wherein the first display control step includes displaying the candidate image in a case where there is no first customer image including the customer having the first degree of similarity to the customer included in the second customer image that is equal to or greater than the first threshold value.

17. The payment method according to 16, further including:

an input reception step of causing the payment apparatus to receive a selection operation for the candidate image, wherein the acquisition step includes acquiring the payment information associated with the selected candidate image.

18. The payment method according to 17, further including:

a determination step of causing the payment apparatus to determine that there is no first customer image including the same customer as the customer included in the second customer image, in a case where the candidate image is not selected.

19. The payment method according to 16 to 18, wherein the first calculation step includes calculating a second degree of similarity between the customer included in the second customer image and the customer included in respective first customer images by using a method different from a method of calculating the first degree of similarity, in a case where there is no first customer image including the customer having the first degree of similarity to the customer included in the second customer image that is equal to or greater than the first threshold value, and wherein the first display control step includes displaying the first customer image including the customer having the second degree of similarity to the customer included in the second customer image that is equal to or greater than the first threshold value, as the candidate image.

20. The payment method according to 16 to 18, wherein the first display control step includes displaying the first customer image including the customer having the first degree of similarity to the customer included in the second customer image equal to or greater than a second threshold value smaller than the first threshold value, in a case where there is no first customer image including the customer having the first degree of similarity to the customer included in the second customer image equal to or greater than the first threshold value.

21. The payment method according to any one of 15 to 18, wherein a plurality of the product registration apparatuses and a plurality of the payment apparatuses are provided in the payment method, and wherein the first display control step includes displaying the first customer image generated by the product registration apparatus associated with the payment apparatus performing the first display control step, as the candidate image.

22. The payment method according to any one of 16 to 20,
wherein the generation step includes generating the association information further indicating a captured time of the first customer image, and
wherein the first calculation step includes calculating a degree of similarity for the first customer image the captured time of which is different from a current time by less than a predetermined time.

23. The payment method according to any one of 15 to 22,
wherein the generation step includes further associating a completion flag indicating whether or not payment using the payment information indicated by the association information has been completed, in that association information,
wherein the payment system further includes a warning apparatus, and
wherein the payment system performs:
a third image capture step of causing the warning apparatus to generate a third customer image including a customer located at an exit of an area in which the payment apparatus is installed, and
a warning step of causing the warning apparatus to perform a warning process in a case where the completion flag, associated with the first customer image including the same customer as the customer included in the third customer image, indicates that the payment using the payment information has not been completed.

24. The payment method according to 23, further including:
a second calculation step of causing the warning apparatus to calculate a third degree of similarity between the customer included in the third customer image and the customer included in respective first customer images,
wherein the warning step includes handling, in a case where there is the first customer image including the customer having the third degree of similarity equal to or greater than a third threshold value, that first customer image as the first customer image including the same customer as the customer included in the third customer image,
wherein the payment method further includes:
a second display control step of causing the warning apparatus to display, on the display apparatus provided at the exit, a second candidate image that is a candidate of the first customer image including the same customer as the customer included in the third customer image, in a case where there is no first customer image including the customer having the third degree of similarity equal to or greater than the third threshold value;
a second input reception step of causing the warning apparatus to receive an input for selecting the second candidate image, and
wherein the warning step includes handling the second candidate image selected through the second input reception unit as the first customer image including the same customer as the customer included in the third customer image, in a case where there is no first customer image including the customer having the third degree of similarity equal to or greater than the third threshold value.

25. The payment method according to 24,
wherein the second calculation step includes calculating a fourth degree of similarity between the customer included in the third customer image and the customer included in respective first customer images by using a method different from the method of calculating the third degree of similarity, in a case where there is no first customer image in which the customer having the third degree of similarity equal to or greater than the third threshold value, and wherein the second display control step includes displaying the first customer image including the customer having the fourth degree of similarity equal to or greater than the third threshold value, as the second candidate image.

26. The payment method according to 24,
wherein the second display control step includes displaying the first customer image including the customer having the third degree of similarity being smaller than the third threshold value and equal to or greater than a fourth threshold value, as the second candidate image.

The invention claimed is:

1. A payment system comprising:
a plurality of product registration apparatuses; and
a payment apparatus,
wherein each of the plurality of product registration apparatuses includes:
a first image capture unit generating a first customer image including a customer; and
a generation unit generating association information that associates payment information used for payment of a product with the first customer image,
wherein the payment apparatus includes:
a second image capture unit generating a second customer image including the customer; and
a first display control unit displaying a candidate image on a display apparatus viewable by the customer, the candidate image, being a candidate of the first customer image, includes a same customer as the customer included in the second customer image,
wherein the first customer image is generated by capturing the customer at a place of at least one of the product registration apparatuses, the second customer image is generated by capturing the customer at a place of the payment apparatus, and the candidate image includes at least one selection from among first customer images, including the first customer image, of customers, including the customer, respectively using the plurality of product registration apparatuses.

2. The payment system according to claim 1, further comprising:
a first calculation unit calculating a first degree of similarity between the customer included in the second customer image and the customer included in respective ones of the first customer images; and
an acquisition unit acquiring, in a case where there is the first customer image including the customer having the first degree of similarity to the customer included in the second customer image that is equal to or greater than the first threshold value, the payment information associated with that first customer image,
wherein the first display control unit displays the candidate image in a case where there is no first customer image including the customer having the first degree of similarity to the customer included in the second customer image that is equal to or greater than the first threshold value.

3. The payment system according to claim 2,
wherein the payment apparatus includes an input reception unit receiving a selection operation for the candidate image,
wherein the acquisition unit acquires the payment information associated with the selected candidate image.

4. The payment system according to claim 3, wherein the payment apparatus includes a determination unit determining that there is no first customer image including the same customer as the customer included in the second customer image, in a case where the candidate image is not selected.

5. The payment system according to claim 2,
wherein the first calculation unit calculates a second degree of similarity between the customer included in the second customer image and the customer included in the respective ones of the first customer images by using a method different from a method of calculating the first degree of similarity, in a case where there is no first customer image including the customer having the first degree of similarity to the customer included in the second customer image that is equal to or greater than the first threshold value, and
wherein the first display control unit displays the first customer image including the customer having the second degree of similarity to the customer included in the second customer image that is equal to or greater than the first threshold value, as the candidate image.

6. The payment system according to claim 2, wherein the first display control unit displays the first customer image including the customer having the first degree of similarity to the customer included in the second customer image equal to or greater than a second threshold value smaller than the first threshold value, in a case where there is no first customer image including the customer having the first degree of similarity to the customer included in the second customer image equal to or greater than the first threshold value.

7. The payment system according to claim 1,
wherein the payment system includes the plurality of the product registration apparatuses and a plurality of the payment apparatuses including the payment apparatus, and
wherein the first display control unit displays the first customer image generated by the product registration apparatus associated with the payment apparatus including the first display control unit, as the candidate image.

8. The payment system according to claim 2,
wherein the generation unit generates the association information further indicating a captured time of the first customer image, and
wherein the first calculation unit calculates a degree of similarity for the first customer image the captured time of which is different from a current time by less than a predetermined time.

9. The payment system according to claim 1,
wherein the generation unit further associates a completion flag indicating whether or not payment using the payment information indicated by the association information has been completed, in that association information, and
wherein the payment system includes a warning apparatus including:
a third image capture unit generating a third customer image including a customer located at an exit of an area in which the payment apparatus is installed; and
a warning unit performing a warning process in a case where the completion flag, associated with the first customer image including the same customer as the customer included in the third customer image, indicates that the payment using the payment information has not been completed.

10. The payment system according to claim 9,
wherein the warning apparatus includes a second calculation unit calculating a third degree of similarity between the customer included in the third customer image and the customer included in respective ones of the first customer images,
wherein the warning unit handles, in a case where there is the first customer image including the customer having the third degree of similarity equal to or greater than a third threshold value, that first customer image as the first customer image including the same customer as the customer included in the third customer image,
wherein the warning apparatus includes:
a second display control unit displaying, on the display apparatus provided at the exit, a second candidate image that is a candidate of the first customer image including the same customer as the customer included in the third customer image, in a case where there is no first customer image including the customer having the third degree of similarity equal to or greater than the third threshold value; and
a second input reception unit receiving an input for selecting the second candidate image, and
wherein the warning unit handles the second candidate image selected through the second input reception unit as the first customer image including the same customer as the customer included in the third customer image, in a case where there is no first customer image including the customer having the third degree of similarity equal to or greater than the third threshold value.

11. The payment system according to claim 10,
wherein the second calculation unit calculates a fourth degree of similarity between the customer included in the third customer image and the customer included in the respective ones of first customer images by using a method different from the method of calculating the third degree of similarity, in a case where there is no first customer image including the customer having the third degree of similarity equal to or greater than the third threshold value, and
wherein the second display control unit displays the first customer image including the customer having the fourth degree of similarity equal to or greater than the third threshold value, as the second candidate image.

12. The information processing system according to claim 10, wherein the second display control unit displays the first customer image including the customer having the third degree of similarity equal to or greater than a fourth threshold value smaller than the third threshold value, as the second candidate image.

13. A payment apparatus included in the information processing system according to claim 1.

14. A non-transitory computer-readable storage medium storing a program causing a computer to operate the payment apparatus according to claim 13.

15. A payment method performed in a payment system including a plurality of product registration apparatuses and a payment apparatus, the payment method comprising:
a first image capture step of causing the product registration apparatus to generate a first customer image including a customer;
a generation step of causing the product registration apparatus to generate association information that associates payment information used for payment of a product with the first customer image;
a second image capture step of causing the payment apparatus to generate a second customer image including a customer; and
a first display control step of causing the payment apparatus to display a candidate image on a display apparatus viewable by the customer, the candidate image, being a candidate of the first customer image, includes a same customer as the customer included in the second customer image, wherein the first customer image is generated by capturing the customer at a place of at least one of the product registration apparatuses, wherein the second customer image is generated by capturing the customer at a place of the payment apparatus, and wherein the candidate image includes at least one selection from among a plurality of first customer images, including the first customer image, of customers, including the customer, respectively using the plurality of product registration apparatuses.

16. A payment system comprising:

a plurality of product registration apparatus; and a payment apparatus, wherein each of the product registration apparatuses includes:
   a first image capture unit generating a first customer image including a customer; and
   a generation unit generating association information that associates payment information used for payment of a product with the first customer image, wherein the payment apparatus includes:
   a second image capture unit generating a second customer image including a customer; and
   a first display control unit displaying a candidate image on a display apparatus viewable by the customer, the candidate image being a candidate of the first customer image that includes the same customer as the customer included in the second customer image, and wherein the generation unit further associates a completion flag indicating whether or not payment using the payment information indicated by the association information has been completed, in that association information, and wherein the payment system further includes a warning apparatus including:
   a third image capture unit generating a third customer image including a customer located at an exit of an area in which the payment apparatus is installed; and
   a warning unit performing a warning process in a case where the completion flag, associated with the first customer image including the same customer as the customer included in the third customer image, indicates that the payment using the payment information has not been completed, wherein the first customer image is generated by capturing the customer at a place of at least one of the product registration apparatuses, the second customer image is generated by capturing the customer at a place of the payment apparatus, and the candidate image includes at least one of a selection from among first customer images, including the first customer image, of customers, including the customer, respectively using the plurality of product registration apparatuses.

* * * * *

UNITED STATES PATENT AND TRADEMARK OFFICE
CERTIFICATE OF CORRECTION

PATENT NO. : 10,878,419 B2
APPLICATION NO. : 15/562220
DATED : December 29, 2020
INVENTOR(S) : Takahiro Matsui Page 1 of 1

It is certified that error appears in the above-identified patent and that said Letters Patent is hereby corrected as shown below:

In the Specification

Column 3, Lines 17-18; After "displays", delete "FIG. 9 is a diagram illustrating display"

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*